United States Patent
Moon et al.

(10) Patent No.: US 12,341,917 B2
(45) Date of Patent: Jun. 24, 2025

(54) FOLDABLE ELECTRONIC DEVICE COMPRISING ELASTIC MEANS

(71) Applicant: SAMSUNG ELECTRONICS CO., LTD., Suwon-si (KR)

(72) Inventors: Youngmin Moon, Suwon-si (KR); Sangung An, Suwon-si (KR); Hyunsuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 384 days.

(21) Appl. No.: 18/110,618

(22) Filed: Feb. 16, 2023

(65) Prior Publication Data
US 2023/0208948 A1    Jun. 29, 2023

Related U.S. Application Data

(63) Continuation of application No. PCT/KR2021/010540, filed on Aug. 10, 2021.

(30) Foreign Application Priority Data

Sep. 8, 2020 (KR) .................. 10-2020-0114516

(51) Int. Cl.
*H04M 1/05* (2006.01)
*G06F 1/16* (2006.01)
(Continued)

(52) U.S. Cl.
CPC .......... *H04M 1/022* (2013.01); *G06F 1/1641* (2013.01); *G06F 1/1652* (2013.01); *G06F 1/1681* (2013.01); *H04M 1/0268* (2013.01)

(58) Field of Classification Search
CPC .... G06F 1/1652; G06F 1/1641; G06F 1/1656; G06F 1/1681; G06F 2203/04102;
(Continued)

(56) References Cited

U.S. PATENT DOCUMENTS

| 6,577,496 B1 | 6/2003 | Gioscia et al. |
| 8,228,667 B2 | 7/2012 | Ma |

(Continued)

FOREIGN PATENT DOCUMENTS

| CN | 208421694 U | 1/2019 |
| CN | 208806017 U | 4/2019 |

(Continued)

OTHER PUBLICATIONS

IP.com search history (Year: 2025).*
(Continued)

*Primary Examiner* — Moustapha Diaby
(74) *Attorney, Agent, or Firm* — Sughrue Mion, PLLC

(57) ABSTRACT

A foldable electronic device includes: a first hinge module; a first pressing part, a first support member, a first housing, each at least partially connected to the first hinge module; a second hinge module; a second pressing part, a second support member, a second housing, each at least partially connected to the second hinge module; a flexible display disposed on the first support member and the second support member; a hinge cover covering the first hinge module and the second hinge module; and an elastic member provided in a gap formed between at least a portion of the flexible display and the hinge cover.

15 Claims, 20 Drawing Sheets

(51) Int. Cl.
*H04M 1/02* (2006.01)
*H04M 1/23* (2006.01)

(58) Field of Classification Search
CPC ..... G09F 9/301; H04M 1/022; H04M 1/0216; H04M 1/0268; F16C 11/04
USPC .......................................................... 455/566
See application file for complete search history.

(56) References Cited

U.S. PATENT DOCUMENTS

| | | | |
|---|---|---|---|
| 8,727,601 | B2 | 5/2014 | Wang et al. |
| 9,874,048 | B1 | 1/2018 | Hsu |
| 10,520,992 | B1* | 12/2019 | Chang .................. H05K 5/0226 |
| 2015/0233162 | A1* | 8/2015 | Lee ....................... H04M 1/022 16/223 |
| 2016/0143162 | A1 | 5/2016 | Van Dijk et al. |
| 2016/0209877 | A1 | 7/2016 | Chong et al. |
| 2016/0302314 | A1 | 10/2016 | Bae et al. |
| 2017/0061836 | A1* | 3/2017 | Kim ....................... G06F 1/1626 |
| 2017/0115701 | A1 | 4/2017 | Bae et al. |
| 2019/0061318 | A1 | 2/2019 | Jung et al. |
| 2019/0098783 | A1* | 3/2019 | Zhang ....................... E05D 3/06 |
| 2019/0280244 | A1 | 9/2019 | Kwon et al. |
| 2019/0346887 | A1 | 11/2019 | Park et al. |
| 2019/0354138 | A1 | 11/2019 | Araki et al. |
| 2019/0390703 | A1* | 12/2019 | Hsu ....................... E05D 11/082 |
| 2020/0233466 | A1* | 7/2020 | Sanchez ................ G06F 1/1681 |
| 2022/0187876 | A1 | 6/2022 | Feng |
| 2022/0248548 | A1 | 8/2022 | Zhong et al. |
| 2022/0263930 | A1* | 8/2022 | Koh ....................... H04M 1/022 |

FOREIGN PATENT DOCUMENTS

| | | |
|---|---|---|
| CN | 110580860 A | 12/2019 |
| CN | 110599907 A | 12/2019 |
| CN | 110784567 A | 2/2020 |
| CN | 112128215 A | 12/2020 |
| JP | 6734473 B2 | 8/2020 |
| KP | 1020160088521 A | 7/2016 |
| KR | 1020160121350 A | 10/2016 |
| KR | 10-2017-0093610 A | 8/2017 |
| KR | 101875855 B1 | 7/2018 |
| KR | 1020190043349 A | 4/2019 |
| KR | 1020190060904 A | 6/2019 |
| KR | 1020190065641 A | 6/2019 |
| KR | 1020190107245 A | 9/2019 |
| KR | 1020190130099 A | 11/2019 |

OTHER PUBLICATIONS

International Search Report (PCT/ISA/210) issued Nov. 8, 2021 from the International Searching Authority to International Application No. PCT/KR2021/010540.

Written Opinion (PCT/ISA/237) issued Nov. 8, 2021 from the International Searching Authority to International Application No. PCT/KR2021/010540.

Communication dated Nov. 16, 2023, issued by European Patent Office in European Patent Application No. 21866999.2.

Office Action issued Nov. 20, 2024 by the Korean Patent Office for KR Patent Application No. 10-2020-0114516.

* cited by examiner

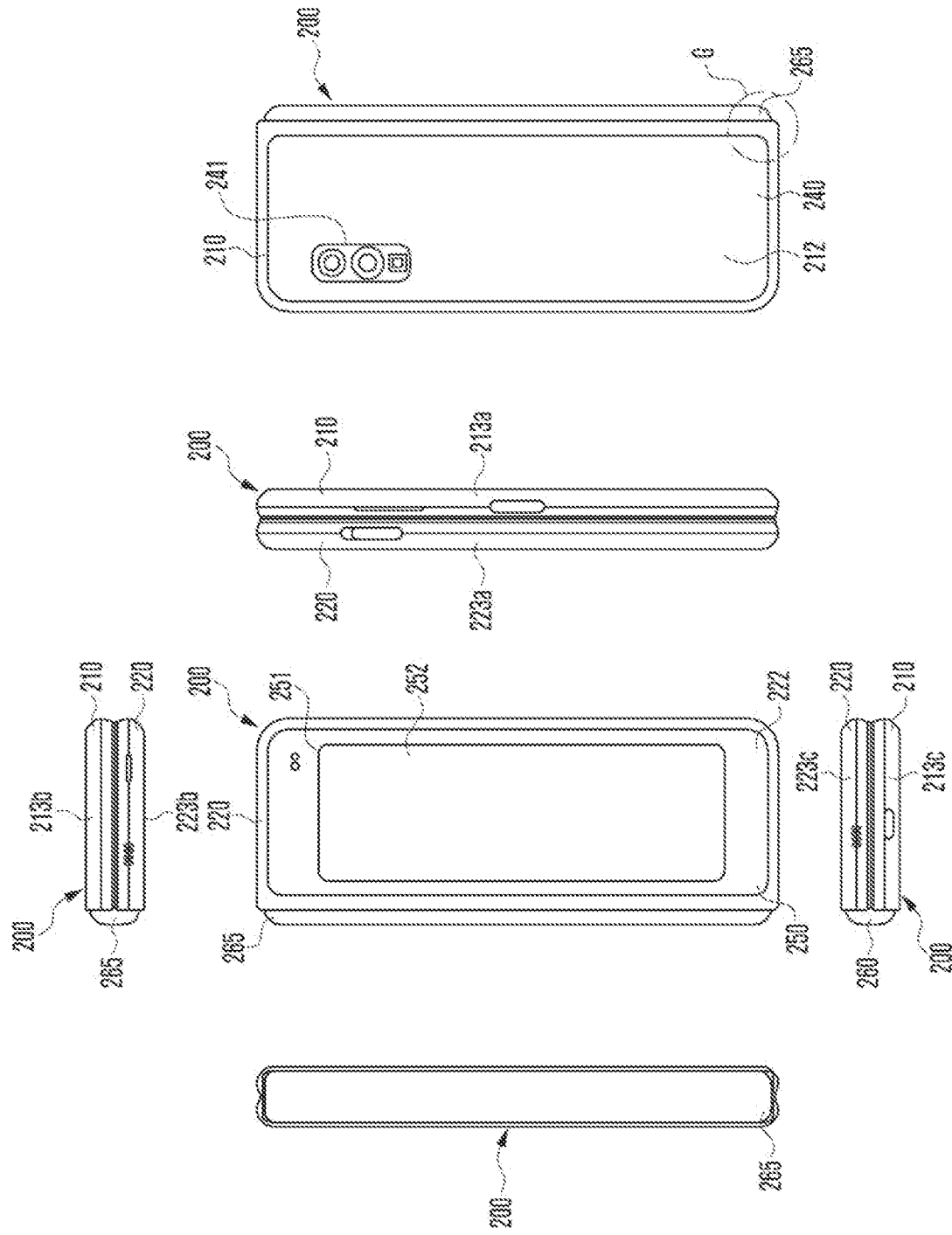

FOLDABLE ELECTRONIC DEVICE COMPRISING ELASTIC MEANS

CROSS-REFERENCE TO RELATED APPLICATIONS

This application is a by-pass continuation application of International Application No. PCT/KR2021/010540, filed on Aug. 10, 2021, which based on and claims priority to Korean Patent Application No. 10-2020-0114516, filed on Sep. 8, 2020, in the Korean Intellectual Property Office, the disclosures of which are incorporated by reference herein in their entireties.

BACKGROUND

1. Field

The disclosure relates to a foldable electronic device comprising an elastic member.

2. Description of Related Art

The use of foldable electronic devices such as a foldable phone, a Z flip, or a tablet PC is increasing. A foldable electronic device may be operated in such a way that a first housing and a second housing are in a folded state or an unfolded state around a hinge module.

For example, the foldable electronic device may be operated in an in-folding and an out-folding manner by rotating the first housing and the second housing through a hinge module.

The foldable electronic device may include a flexible display disposed at an upper portion of a position corresponding to the first housing and the second housing to be at least partially across the first housing and the second housing.

The foldable electronic device may also be folded in the case that the first housing and the second housing are folded through the hinge module.

In the case that the flexible display is in a folded state, a space (e.g., an air gap or a gap) that does not contact the first housing and the second housing may be formed in at least a portion of a lower portion of a central portion (e.g., a bending area) of the flexible display. In addition, in the case that the flexible display is in an unfolded state, a space (e.g., an air gap or a gap) that does not contact the first housing and the second housing may be formed in at least a portion of a lower portion of a central portion (e.g., a bending area) of the flexible display.

A deformation such as a wrinkle or bending may occur in the vicinity of the bending area of the foldable electronic device because of the space formed under the bending area (e.g., folding area) of the flexible display as the foldable electronic device repeats folding and unfolding operations.

Damage such as a crack may occur in the foldable electronic device in the case that the external environment has a low temperature because cold air is maintained in the space formed under the bending area and the foldable electronic device repeats folding and unfolding operations.

One or more embodiments of the present disclosure may provide a foldable electronic device capable of preventing deformation of a flexible display by providing an elastic member in a space (e.g., an air gap) formed under a bending area (e.g., folding area) of the flexible display and, in the case that the foldable electronic device is in an unfolded state, by pressing the elastic member through a pressing means integrally operating with the hinge module and supporting the bending area.

One or more embodiments of the present disclosure may provide a foldable electronic device capable of preventing damage of a flexible display by providing an elastic member with high thermal conductivity in a space (e.g., an air gap) formed under a bending area (e.g., folding area) of the flexible display and by reducing the temperature deviation of the space.

SUMMARY

According to an aspect of the disclosure, a foldable electronic device includes: a first hinge module; a first pressing part, a first support member, a first housing, each at least partially connected to the first hinge module; a second hinge module; a second pressing part, a second support member, a second housing, each at least partially connected to the second hinge module; a flexible display disposed on the first support member and the second support member; a hinge cover covering the first hinge module and the second hinge module; and an elastic member provided in a gap formed between at least a portion of the flexible display and the hinge cover. In a first case that the first housing and the second housing are in a substantially parallel unfolded state, the first pressing part and the second pressing part press a first side and a second side of the elastic member, and an upper portion of the elastic member supports at least a portion of the flexible display.

According to another aspect of the disclosure, in a second case that the first housing and the second housing are in a folded state to substantially face each other, the first pressing part and the second pressing part do not press the first side and the second side of the elastic member, and at least a portion of the flexible display presses the upper portion of the elastic member. According to another aspect of the disclosure, a foldable electronic device includes: a hinge module; a first pressing part and a second pressing part each at least partially connected to the hinge module; a first support member at least partially connected to the hinge module; a second support member each at least partially connected to the hinge module; a first housing at least partially connected to the hinge module; a second housing at least partially connected to the hinge module; a flexible display disposed on an upper portion of the first support member and an upper portion of the second support member; a hinge cover that covers the hinge module; and an elastic member provided in a gap formed between at least a portion of the flexible display and the hinge cover. In a first case that the first housing and the second housing are in a substantially parallel unfolded state, the first pressing part and the second pressing part press at least a portion of a first side and a second side of the elastic member, and an upper portion of the elastic member supports at least a portion of the flexible display.

According to one or more embodiments of the present disclosure, deformation of a flexible display may be prevented by providing an elastic member in a space (e.g., an air gap) formed under a bending area (e.g., a folding area) of the flexible display and, in the case that the foldable electronic device is in an unfolded state, by pressing the elastic member through a pressing means operating integrally with a hinge module and supporting the bending area.

According to one or more embodiments of the present disclosure, damage of a flexible display may be prevented by providing an elastic member having high thermal conductivity in a space (e.g., an air gap) formed under a bending area (e.g., a folding area) of the flexible display and by reducing the temperature deviation of the space.

BRIEF DESCRIPTION OF THE DRAWINGS

In connection with the description of the drawings, the same or similar reference numerals may be used for the same or similar components. The above and other aspects, features, and advantages of certain embodiments of the present disclosure will be more apparent from the following description taken in conjunction with the accompanying drawings, in which:

FIG. 2B illustrates a folded state of a foldable electronic device according to one or more embodiments of the present disclosure;

DETAILED DESCRIPTION

Figure 1A:
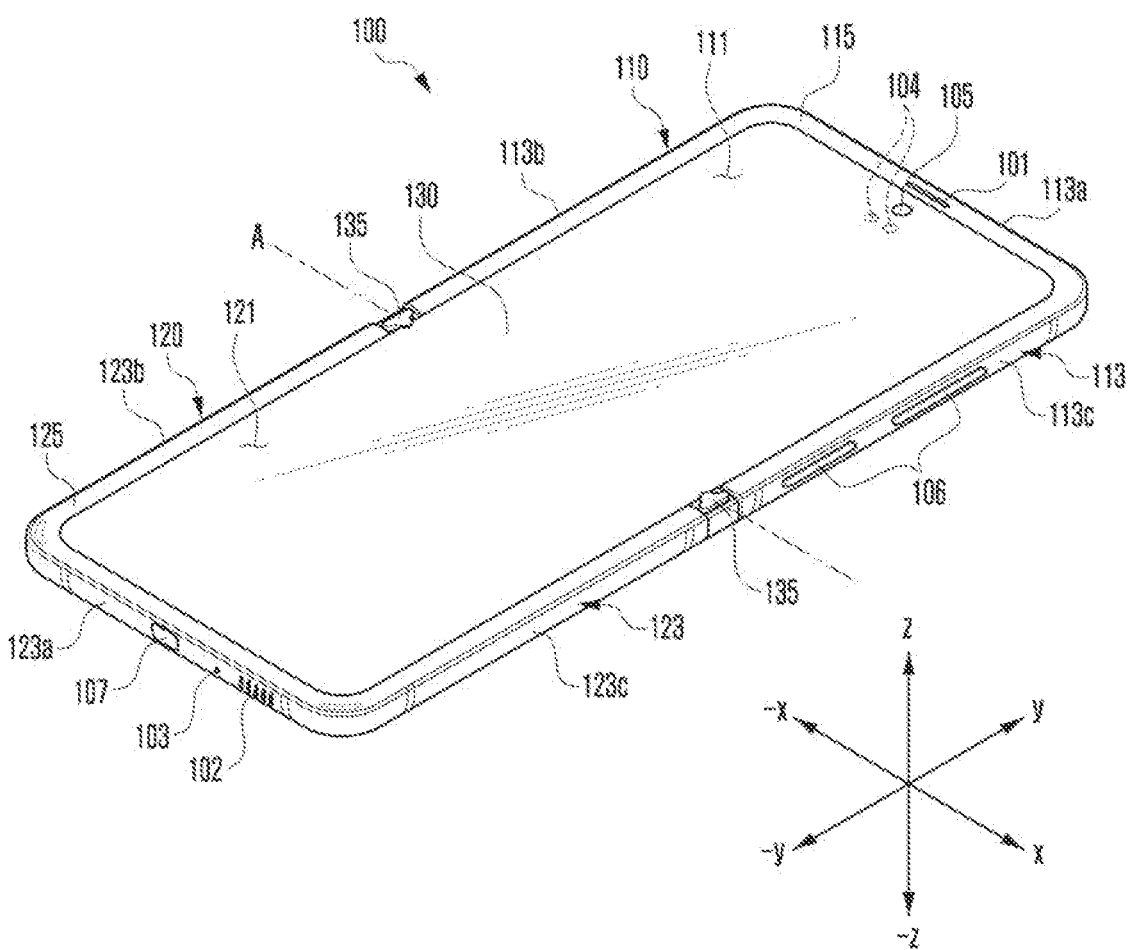
FIG. 1A illustrates the front surface of a foldable electronic device (e.g., Z flip) in an unfolded state according to one or more embodiments of the present disclosure.

It should be appreciated that one or more embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., the first element) is referred to, with or without the term "operatively" or "communicatively", as "coupled with", "coupled to", "connected with", or "connected to" another element (e.g., the second element), it means that the element may be coupled with the other element directly (e.g., wiredly), wirelessly, or via the third element.

As used herein, the term module may be an integrally formed part or a minimum unit or a portion of a part that performs one or more functions.

Figure 1B:
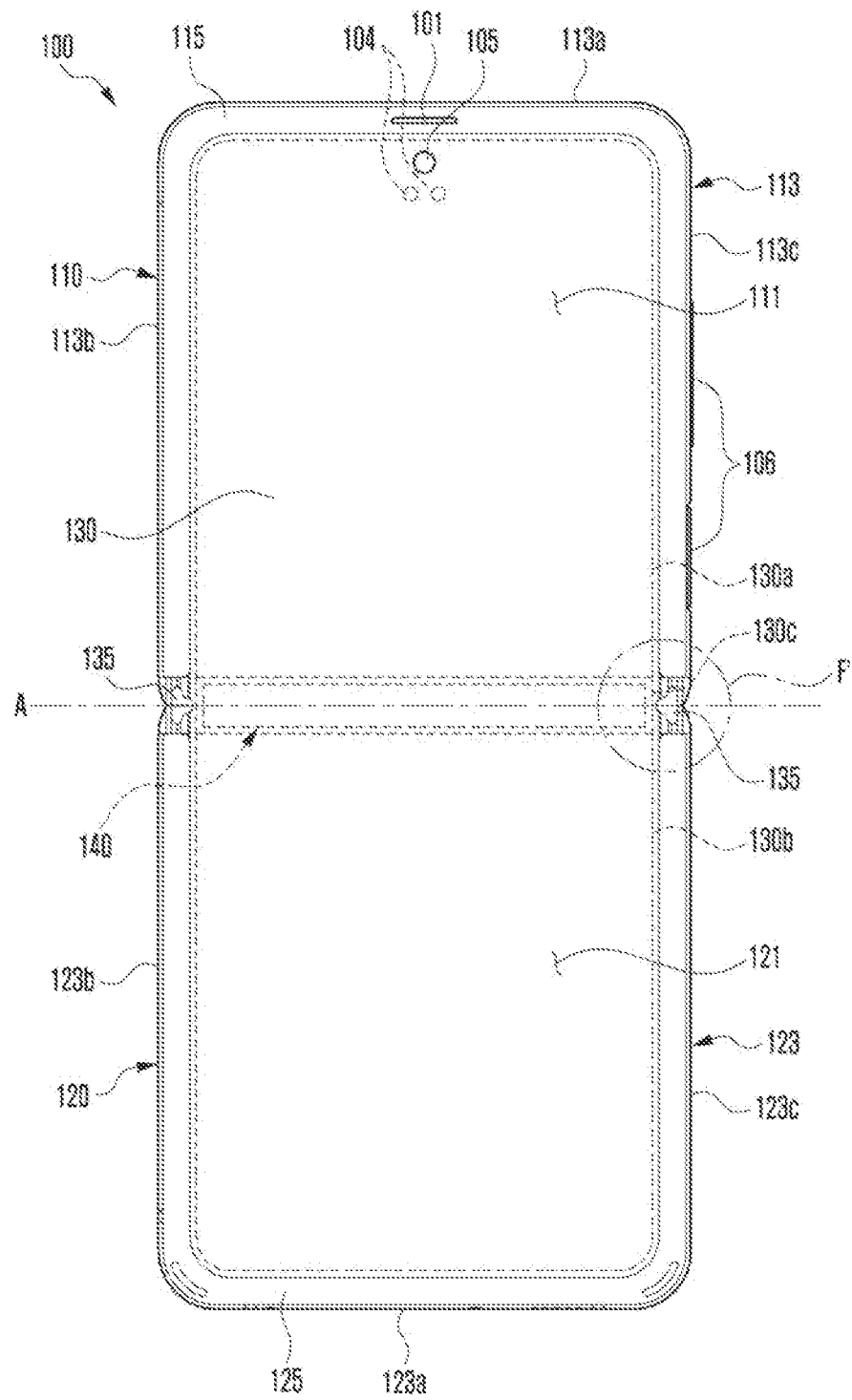
FIG. 1B illustrates a front surface of a foldable electronic device in an unfolded state according to one or more embodiments of the present disclosure.
Figure 1C:
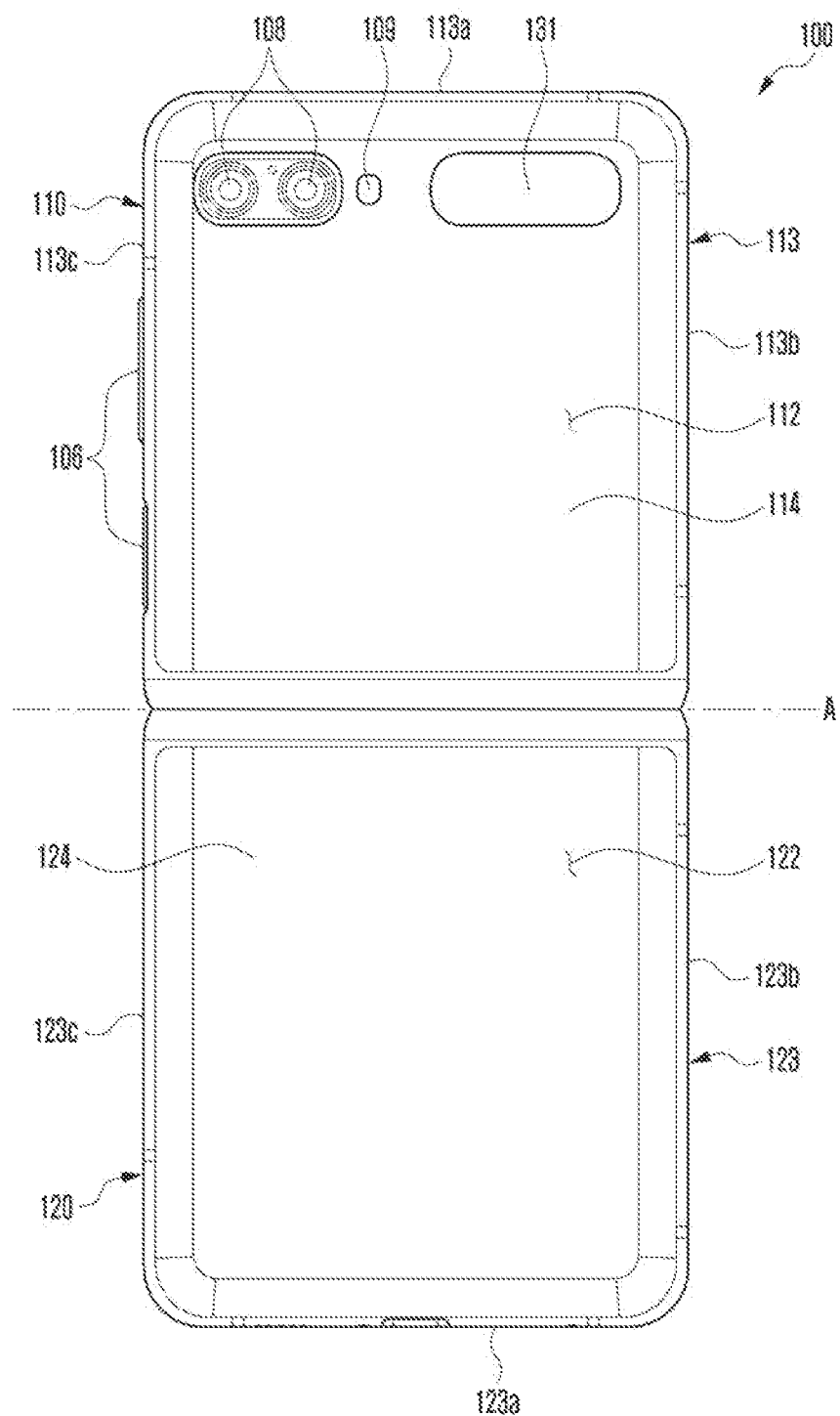
FIG. 1C illustrates a rear surface of a foldable electronic device in an unfolded state according to one or more embodiments of the present disclosure.
Figure 1D:
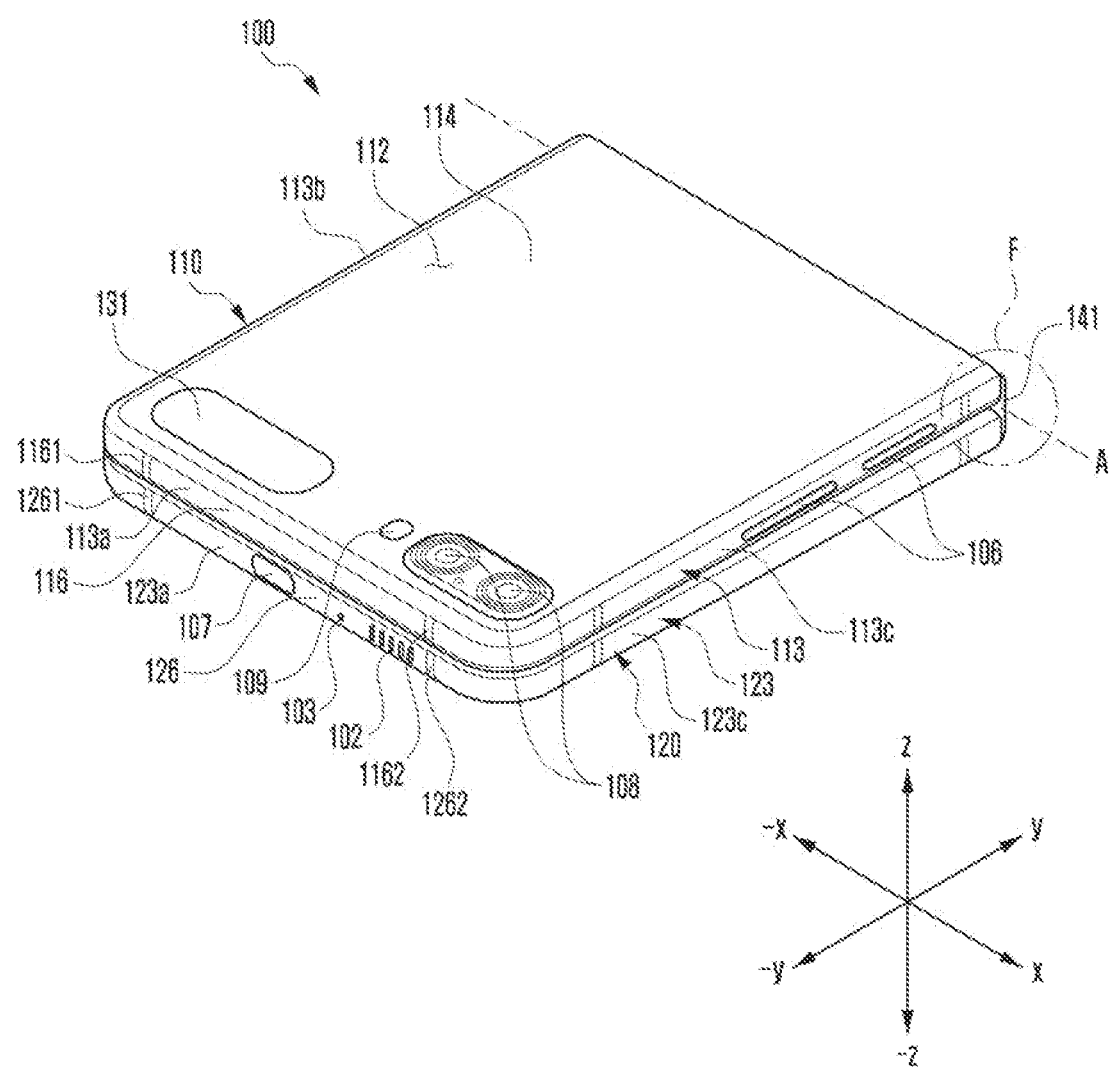
FIG. 1D illustrates an unfolded state of a foldable electronic device according to one or more embodiments of the present disclosure.
Figure 1E:
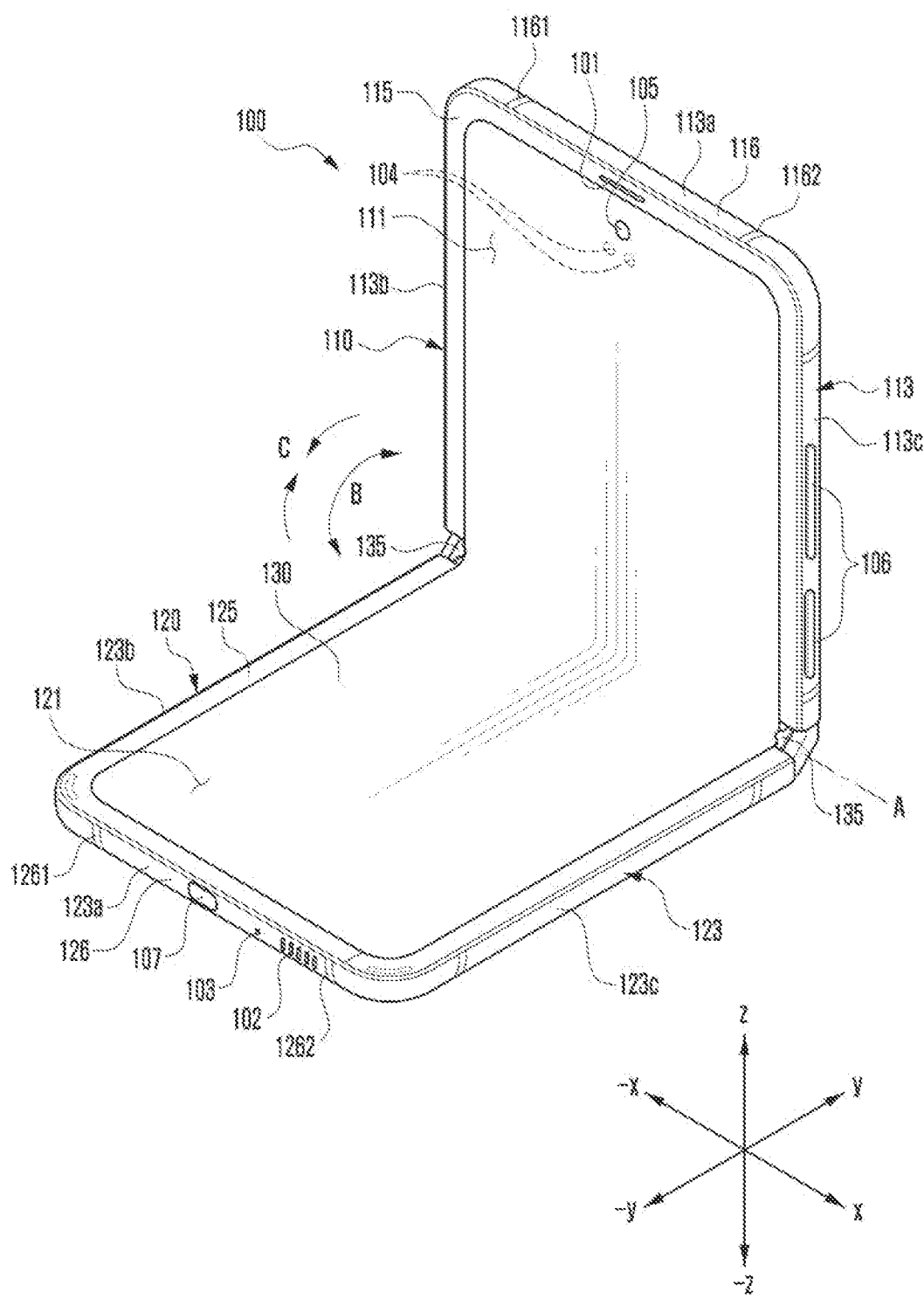
FIG. 1E illustrates an intermediate state of a foldable electronic device according to one or more embodiments of the present disclosure.

FIG. 1A is a perspective view illustrating a front surface of a foldable electronic device (e.g., a Z flip) in an unfolded or flat state according to one or more embodiments of the present disclosure. FIG. 1B is a plane view illustrating a front surface of a foldable electronic device in an unfolded state according to one or more embodiments of the present disclosure. FIG. 1C is a plane view illustrating a rear surface of a foldable electronic device in an unfolded state according to one or more embodiments of the present disclosure. FIG. 1D is a perspective view illustrating an unfolded state of a foldable electronic device according to one or more embodiments of the present disclosure. FIG. 1E is a front perspective view of an intermediate state of a foldable electronic device according to one or more embodiments of the present disclosure.

The foldable electronic device 100 illustrated in FIGS. 1A to 1E may include a Z flip type (e.g., vertical folding) foldable electronic device.

With reference to FIGS. 1A to 1E, the foldable electronic device 100 according to one or more embodiments of the present disclosure may include a pair of housings (e.g., the first housing 110 and the second housing 120) (e.g., the foldable housing) that face each other and are folded on the basis of a hinge module (e.g., the hinge module 140 of FIG. 1B). In some embodiments, the hinge module (e.g., the hinge module 140 of FIG. 1B) may be disposed in the X-axis direction or the Y-axis direction. In some embodiments, two or more hinge modules (e.g., the hinge module 140 of FIG. 1B) may be arranged to be folded in the same direction or in different direction.

According to one or more embodiments, the foldable electronic device 100 may include a flexible display 130 (e.g., a foldable display) disposed in an area formed by a pair of housings (the first housing 110 and the second housing 120). According to an embodiment, the first housing 110 and the second housing 120 may be disposed on opposite sides centered on the folding axis (A axis), and they may have a substantially symmetrical shape with respect to the folding axis (A axis). According to an embodiment, the first housing 110 and the second housing 120 may have different angles or distances formed from each other depending on whether the foldable electronic device 100 is in an unfolded (unfolded or flat) state, a folded state (folding), or an intermediate state.

According to one or more embodiments, the pair of housings (the first housing 110 and the second housing 120) may include a first housing 110 (e.g., a first housing structure) coupled with a first side of a hinge module (e.g., the hinge module 140 of FIG. 1B) and a second housing 120 (e.g., a second housing structure) coupled to the second side of the hinge module (e.g., the hinge module 140 of FIG. 1B). According to an embodiment, the first housing 110, which is in the unfolded state, may include a first surface 111 facing a first direction (e.g., a front direction) (z-axis direction) and a second surface 112 facing a second direction (e.g., a rear direction) (−z-axis direction) opposite to the first direction. According to an embodiment, the second housing 120, in the unfolded state, may include a third surface 121 facing the first direction (z-axis direction) and a fourth surface 122 facing the second direction (−z-axis direction).

According to an embodiment, in the unfolded state, the foldable electronic device 100 may be operated in such a way that the first surface 111 of the first housing 110 and the third surface 121 of the second housing 120 face substantially the identical first direction (e.g., z-axis direction), and in the folded state, the first surface 111 and the third surface 121 face each other. According to an embodiment, the foldable electronic device 100 may be operated in such a way that the second surface 112 of the first housing 110 and the fourth surface 122 of the second housing 120 face substantially the identical second direction (e.g., −z-axis direction), and in the folded state, the second surface 112 and the fourth surface 122 face opposite directions. For example, in the folded state the second surface 112 may face the first direction (e.g., z-axis direction) and the fourth surface 122 may face the second direction (e.g., −z axis direction).

According to one or more embodiments, the first housing 110 may include a first lateral frame 113 that at least partially forms an exterior of the foldable electronic device 100, and a first rear surface cover 114 that is coupled to the first lateral frame 113 and forms at least a portion of the second surface 112 of the foldable electronic device 100. According to an embodiment, the first lateral frame 113 may include a first lateral 113a, a second lateral 113b extending from one end of the first lateral 113a, and a third lateral 113c extending from the other end of the first lateral 113a. According to an embodiment, the first lateral frame 113 may be formed in a quadrilateral (e.g., square or rectangular) shape through the first lateral 113a, the second lateral 113b, and the third lateral 113c.

According to one or more embodiments, the second housing 120 may include a second lateral frame 123 that at least partially forms an exterior of the foldable electronic device 100 and a second rear surface cover 124 that is coupled to the second lateral frame 123 and forms at least a portion of the fourth surface 122 of the foldable electronic device 100. According to an embodiment, the second lateral frame 123 may include a fourth lateral 123a, a fifth lateral 123b extending from one end of the fourth lateral 123a, and a sixth lateral 123c extending from the other end of the fourth lateral 123a. According to an embodiment, the second lateral frame 123 may be formed in a quadrilateral (e.g., square or rectangular) shape through the fourth lateral 123a, the fifth lateral 123b, and the sixth lateral 123c.

According to one or more embodiments, the pair of housings (the first housing 110 and the second housing 120) is not limited to the illustrated shape and combination and may be implemented by a combination and/or coupling of other shapes or parts. For example, in some embodiments, the first lateral frame 113 may be integrally formed with the first rear surface cover 114, and the second lateral frame 123 may be integrally formed with the second rear surface cover 124.

According to one or more embodiments, in the unfolded state of the foldable electronic device 100, the second lateral 113b of the first lateral frame 113 and the fifth lateral 123b of the second lateral frame 123 may be substantially connected without a gap. According to an embodiment, in the unfolded state of the foldable electronic device 100, the third lateral 113c of the first lateral frame 113 and the sixth lateral 123c of the second lateral frame 123 may be substantially connected without a gap. According to an embodiment, in the unfolded state of the foldable electronic device 100, the combined length of the second lateral 113b and the fifth lateral 123b may be configured to be longer than the length of the first lateral 113a and/or the fourth lateral 123a. In addition, the combined length of the third lateral 113c and the sixth lateral 123c may be configured to be longer than the length of the first lateral 113a and/or the fourth lateral 123a.

According to one or more embodiments, the first lateral frame 113 and/or the second lateral frame 123 may be formed of a metal or may further include a polymer injected into the metal. According to an embodiment, the first lateral frame 113 and/or the second lateral frame 123 may include at least one conductive portion 116 and/or 126 electrically segmented through at least one segmentation portion 1161 and 1162 and/or 1261 and 1262 formed of a polymer. In this case, at least one conductive part may be used as an antenna operating in at least one band (e.g., legacy band) designated by being electrically connected to a wireless communication module included in the foldable electronic device 100.

According to one or more embodiments, the first rear surface cover 114 and/or the second rear surface cover 124 may be, for example, formed by at least one or a combination of at least two of coated or colored glass, ceramic, polymer, or metal (e.g., aluminum, stainless steel (STS), or magnesium).

According to one or more embodiments, the flexible display 130 may be arranged to extend to at least a portion of the third surface 121 of the second housing 120 from the first surface 111 of the first housing 110 crossing the hinge module (e.g., the hinge module 140 of FIG. 2B). For example, the flexible display 130 may include a first planar area 130a substantially corresponding to the first surface 111, a second planar area 130b corresponding to the third surface 121, and a bending area 130c (e.g., a folding area) connecting the first planar area 130a and the second planar area 130b and corresponding to the hinge module (e.g., hinge module 140 of FIG. 1B).

According to an embodiment, the flexible display 130 may include an unbreakable (UB) type organic light-emitting diode (OLED) display (e.g., curved display). However, the flexible display 130 is not limited thereto and may include a flat type display of an On Cell Touch AMOLED (active matrix OLED) (OCTA) type.

According to an embodiment, in the case that the flexible display 130 is in the folded or unfolded state, a space (e.g., air gap) may be formed in at least a portion of the lower portion of the bending area 130c that does not contact with the first housing 110 and the second housing 120. An elastic member to be described later may be provided in the space formed under the bending area 130c.

According to one or more embodiments, the foldable electronic device 100 may include a first protective cover 115 (e.g., a first protective frame or a first decoration member) coupled along an edge of the first housing 110. According to an embodiment, the foldable electronic device 100 may include a second protective cover 125 (e.g., a second protective frame or a second decoration member) coupled along an edge of the second housing 120. According to an embodiment, the first protective cover 115 and/or the second protective cover 125 may be formed of a metal or polymer material. According to an embodiment, the first protective cover 115 and/or the second protective cover 125 may be used as a decoration member.

According to one or more embodiments, the flexible display 130 may be positioned such that an edge of the first planar area 130a is interposed between the first housing 110 and the first protective cover 115. According to an embodiment, the flexible display 130 may be positioned such that an edge of the second planar area 130b is interposed between the second housing 120 and the second protective cover 125. According to an embodiment, the edge of the flexible display 130 may be protected through the protection cap 135 disposed in an area corresponding to the hinge module (e.g., the hinge module 140 of FIG. 1B).

According to one or more embodiments, the foldable electronic device 100 may include a hinge cover 141 (e.g., a hinge housing). The hinge cover 141 may be disposed to support the hinge module (e.g., the hinge module 140 of FIG. 1B), be exposed to the outside in the case that the foldable electronic device 100 is in a folded state, and be invisible from the outside in the case that the foldable electronic device 100 is in an unfolded state by being accommodated in the first space (e.g., the internal space of the first housing 110) and the second space (e.g., the internal space of the second housing 120). In some embodiments, the flexible display 130 may be disposed to extend from at least a portion of the second surface 112 to at least a portion of the fourth surface 122. In this case, the foldable electronic device 100 may be folded so that the flexible display 130 may be visually exposed to the outside (e.g., an out-folding method).

According to one or more embodiments, the foldable electronic device 100 may include a sub-display 131 disposed separately from the flexible display 130. According to an embodiment, the sub-display 131 is arranged to be visually exposed at least partially on the second surface 112 of the first housing 110, so that in the case that the foldable electronic device 100 is in a folded state, the state information of the flexible display 130 may be displayed. According to an embodiment, the sub-display 131 may be arranged to be visible from the outside through at least a partial area of the first rear surface cover 114. In some embodiments, the sub-display 131 may be disposed on the fourth surface 122 of the second housing 120. In this case, the sub-display 131 may be disposed to be visible from the outside through at least a partial area of the second rear surface cover 124.

According to one or more embodiments, the foldable electronic device 100 may include at least one of an input device 103 (e.g., a microphone), sound output devices 101 and 102, a sensor module 104, camera devices 105 and 108, and a key input device 106 or a connector port 107. In the illustrated embodiment, an input device 103 (e.g., a microphone), a sound output device 101 and 102, a sensor module 104, a camera device 105 and 108, and a key input device 106 or a connector port 107 are referred to as a hole or shape formed in the first housing 110 or the second housing 120, but they are disposed inside the foldable electronic device 100 and may be defined to include a substantial electronic component (e.g., input device, sound output device, sensor module, or camera device) that operates through the hole or shape.

According to one or more embodiments, the input device 103 may include at least one microphone disposed in the second housing 120. In some embodiments, the input device 103 may include a plurality of microphones 103 arranged to sense the direction of sound. In some embodiments, the plurality of microphones 103 may be disposed at designated locations on the first housing 110 and/or the second housing 120. According to an embodiment, the sound output devices may include speakers 101 and 102. According to an embodiment, the sound output devices may include a receiver 101 for a call disposed in the first housing 110 and a speaker 102 disposed in the second housing 120. In some embodiments, the input device 103, the sound output devices 101 and 102, and the connector port 107 are provided in a space provided in the first housing 110 and/or the second housing 120 of the foldable electronic device 100 and may be exposed to the outside through at least one hole formed in the first housing 110 and/or the second housing 120. According to an embodiment, at least one connector port 107 may be used to transmit/receive power and/or data to/from an external electronic device. In some embodiments, at least one connector port (e.g., an ear jack hole) may accommodate a connector (e.g., an ear jack) for transmitting and receiving audio signals to and from an external electronic device. In some embodiments, the holes formed in the first housing 110 and/or the second housing 120 may be used commonly for the input device 103 and the sound output devices 101 and 102. In some embodiments, the sound output devices 101 and 102 may include a speaker (e.g., a piezo speaker) that operates without holes formed in the first housing 110 and/or the second housing 120.

According to one or more embodiments, the sensor module 104 may generate an electrical signal or data value corresponding to an internal operating state of the foldable electronic device 100 or an external environmental state. The sensor module 104 may detect the external environment, for example, through the first surface 111 of the first housing 110. In some embodiments, the foldable electronic device 100 may further include at least one sensor module disposed to detect an external environment through the second surface 112 of the first housing 110. According to an embodiment, the sensor module 104 (e.g., an illuminance sensor) may be disposed under the flexible display 130 to detect an external environment through the flexible display 130. According to an embodiment, the sensor module 104 may include at least one of a gesture sensor, a gyro sensor, a barometric pressure sensor, a magnetic sensor, an acceleration sensor, a grip sensor, a color sensor, an IR (infrared) sensor, a biometric sensor, a temperature sensor, a humidity sensor, an illuminance sensor, a proximity sensor, a fingerprint sensor, or an ultrasonic sensor.

According to one or more embodiments, the camera devices 105 and 108 may include a first camera device 105 (e.g., a front camera device) disposed on the first surface 111 of the first housing 110 and a second camera device 108 disposed on the second surface 112 of the first housing 110. The foldable electronic device 100 may further include a flash 109 disposed near the second camera device 108. According to an embodiment, the camera devices 105 and 108 may include one or more lenses, an image sensor, and/or an image signal processor. The flash 109 may include, for example, a light emitting diode or a xenon lamp. According to an embodiment, two or more lenses (e.g., a wide-angle lens, an ultra-wide-angle lens, or a telephoto lens) and image sensors of the camera device 105 and 108 may be disposed on one surface (e.g., a first surface 111, a second surface 112, a third surface 121, or a fourth surface 122) of the foldable electronic device 100. In some embodiments, the camera devices 105 and 108 may include lenses and/or an image sensor for time of flight (TOF).

According to one or more embodiments, the key input device 106 (e.g., a key button) may be disposed on the third lateral 113c of the first lateral frame 113 of the first housing 110. In some embodiments, the key input device 106 may be disposed at least on one of the first lateral 113a and the second lateral 113b of the first housing 110 and/or the laterals (the fourth lateral 123a, the fifth lateral 123b, and the sixth lateral 123c) of the second housing 120. In some embodiments, the foldable electronic device 100 may not include some or all of the key input devices 106, and key input devices not included may be implemented in another form such as soft keys on the flexible display 130. In some embodiments, the key input device 106 may be implemented using a pressure sensor included in the flexible display 130.

According to one or more embodiments, some of the camera devices 105 and 108 (e.g., the first camera device 105) or the sensor module 104 may be disposed to be exposed through the flexible display 130. For example, the first camera device 105 or the sensor module 104 may be disposed to be connected to the outside environment through an opening (e.g., a through hole) at least partially formed in the flexible display 130 in the internal space of the foldable electronic device 100. According to an embodiment, some sensor modules 104 may be arranged in the internal space of the foldable electronic device 100 to perform their functions without being visually exposed through the flexible display 130. In this case, it may not be necessary to open the area facing the sensor module of the flexible display 130.

With reference to FIG. 1E, the foldable electronic device 100 may be operated to maintain an intermediate folded state through a hinge module (e.g., the hinge module 140 of FIG. 1B). In this case, the foldable electronic device 100 may control the flexible display 130 so that different contents are displayed in a display area corresponding to the first surface 111 and a display area corresponding to the third surface 121. According to an embodiment, the foldable electronic device 100 may operate in a substantially unfolded state (e.g., unfolded state in FIG. 1A) and/or in a substantially folded state (e.g., folded state in FIG. 1D) based on a predetermined inflection angle (e.g., an angle between the first housing 110 and the second housing 120 in an intermediate folded state) through the hinge module (e.g., the hinge module 140 of FIG. 1B). For example, the foldable electronic device 100 may be operated so that it can be in an unfolded state (e.g., unfolded state in FIG. 1A) when pressure is applied in the unfolding direction (B direction) in a state in which the foldable electronic device 100 is unfolded at a predetermined inflection angle through the hinge module (e.g., the hinge module 140 of FIG. 1B). For example, the foldable electronic device 100 may be operated so that it can be in a closed state (e.g., folded state in FIG. 1D) when pressure is applied in a folding direction (C direction) in a state in which the foldable electronic device 100 is unfolded at a predetermined inflection angle through the hinge module (e.g., the hinge module 140 of FIG. 1B). According to an embodiment, the foldable electronic device 100 may be operated to maintain the folded or unfolded state at various angles through the hinge module (e.g., the hinge module 140 of FIG. 1B).

Figure 2A:
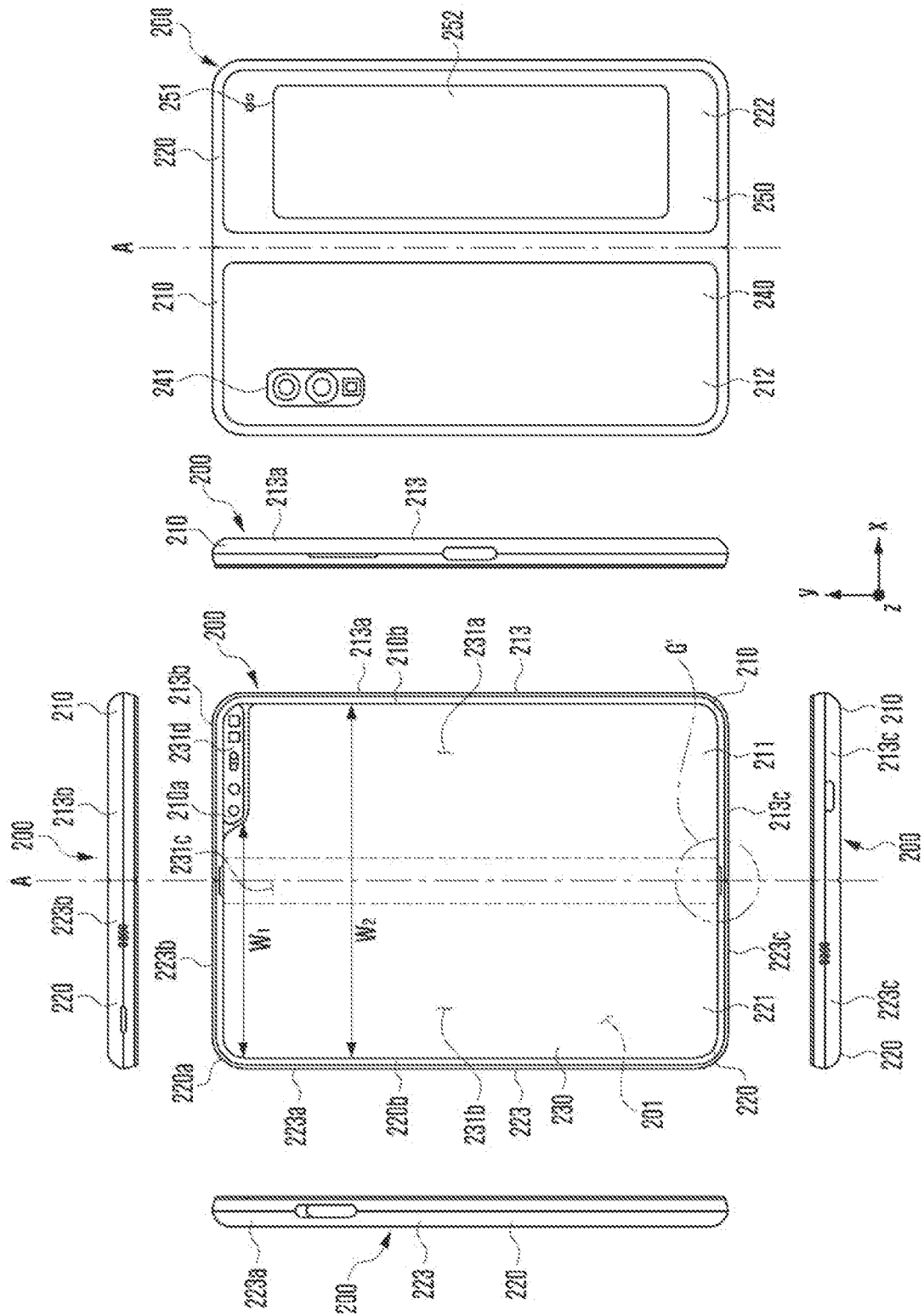
FIG. 2A illustrates an unfolded state of a foldable electronic device (e.g., a foldable phone) according to one or more embodiments of the present disclosure.
Figure 2C:
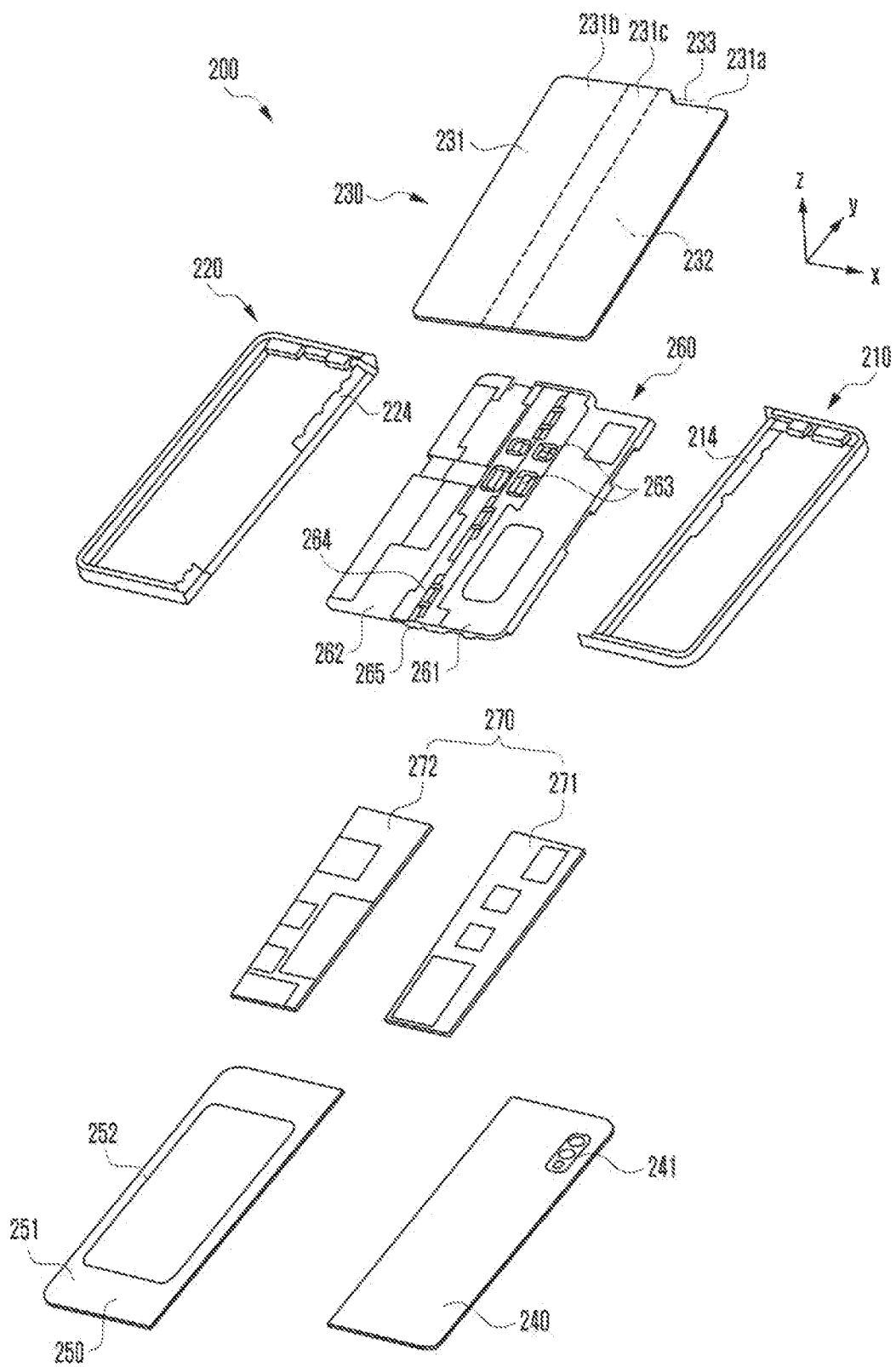
FIG. 2C illustrates an exploded perspective view of a foldable electronic device according to one or more embodiments of the present disclosure.

FIG. 2A is a diagram illustrating an unfolded state of a foldable electronic device (e.g., a foldable phone) according to one or more embodiments of the present disclosure. FIG. 2B is a diagram illustrating a folded state of a foldable electronic device according to one or more embodiments of the present disclosure. FIG. 2C is a diagram schematically illustrating an exploded perspective view of a foldable electronic device according to one or more embodiments of the present disclosure.

According to one or more embodiments, the embodiments shown in FIGS. 1A to 1E may be included in the embodiments shown in FIGS. 2A to 2C.

The foldable electronic device 200 illustrated in FIGS. 2A to 2C may include a foldable phone type (e.g., horizontal folding) foldable electronic device.

With reference to FIGS. 2A to 2C, according to one or more embodiments of the present disclosure, the foldable electronic device 200 may include a pair of housings (e.g., the first housing 210 and the second housing 220) (e.g., the foldable housing) that face each other and are folded on the basis of a hinge module (e.g., the hinge module 264 of FIG. c). According to an embodiment, the foldable electronic device 200 may include a hinge cover (e.g., the hinge cover of FIG. 2B) that covers foldable portions of a pair of housings (e.g., the first housing 210 and the second housing 220) and a flexible display 230 (e.g., a foldable display) disposed in a space formed by a pair of housings (e.g., the first housing 210 and the second housing 220).

According to one or more embodiments, the flexible display 230 disposed in a space formed by a pair of housings (e.g., the first housing 210 and the second housing 220) may include one display or at least two displays.

According to one or more embodiments, the surface on which the flexible display 230 is disposed may be defined as the front surface (or the first surface) of the foldable electronic device 200, and the opposite surface of the front surface may be defined as the rear surface (or the second surface) of the foldable electronic device 200. A surface surrounding the space between the front and rear surfaces may be defined as a side surface of the foldable electronic device 200.

According to one or more embodiments, a pair of housings (e.g., the first housing 210 and the second housing 220) may include a first housing 210 that includes a sensor area 231d, a second housing 220, a first rear surface cover 240, and a second rear surface cover 250. The pair of housings (the first housing 210 and the second housing 220) of the foldable electronic device 200 are not limited to the shape and combination shown in FIGS. 2A and 2C, and they may be implemented by a combination and/or coupling of other shapes or parts. For example, in another embodiment, the first housing 210 and the first rear surface cover 240 may be integrally formed, and the second housing 220 and the second rear surface cover 250 may be integrally formed.

According to one or more embodiments, the first housing 210 and the second housing 220 may be disposed on opposite sides centered on the folding axis (A axis), and they may have a symmetrical shape as a whole with respect to the folding axis (A axis). According to an embodiment, the first housing 210 and the second housing 220 may have different angles or distances formed from each other depending on whether the foldable electronic device 200 is in an unfolded (unfolding or flat) state, a folded state, or an intermediate state. According to an embodiment, the first housing 210 may additionally include a sensor area 231d in which various sensors are disposed, unlike the second housing 220, but it may have a mutually symmetrical shape in other areas. According to an embodiment, the sensor area 231d may be additionally disposed at or replaced with at least a partial area of the second housing 220. According to an embodiment, the first housing 210 and the second housing 220 may have an asymmetrical shape with respect to the folding axis (A). For example, in the case that the foldable electronic device 200 is in a folded state, the first housing 210 and the second housing 220 may also be folded in an asymmetrical form centered on the folding axis (A) so that a portion of the flexible display 230 may be exposed to the outside of the foldable electronic device 200.

According to one or more embodiments, the first housing 210 may be connected to a hinge module (e.g., the hinge module 264 of FIG. 2C) in an unfolded state of the foldable electronic device 200; and it may include a first surface 211 disposed to face the front side of the foldable electronic device 200, a second surface 212 facing the opposite direction of the first surface 211, and a first lateral member 213 surrounding at least a portion of the space between the first surface 211 and the second surface 212. According to an embodiment, the first lateral member 213 may include a first lateral 213a disposed parallel to the folding axis (A axis), a second lateral 213b extended from one end of the first lateral 213a in a direction perpendicular to the folding axis (A axis), and a third lateral 213c extended from the other end of the first lateral 213a in a direction perpendicular to the folding axis (A axis).

According to one or more embodiments, the second housing 220 may be connected to a hinge module (e.g., the hinge module 264 of FIG. 2C) in an unfolded state of the foldable electronic device 200; and it may include a third surface 221 disposed to face the front surface of the foldable electronic device 200, a fourth surface 222 facing the opposite direction to the third surface 221, and a second lateral member 223 surrounding at least a portion of the space between the third surface 221 and the fourth surface 222. According to an embodiment, the second lateral member 223 may include a fourth side surface 223a disposed in parallel to the folding axis (A axis), a fifth lateral 223b extended from one end of the fourth lateral 223a in a direction perpendicular to the folding axis (A axis), and a sixth lateral 223c extended from the other end of the fourth lateral 223a in a direction perpendicular to the folding axis (A axis). According to an embodiment, the third surface 221 may face the first surface 211 in a folded state.

According to one or more embodiments, the foldable electronic device 200 may include a recess 201 formed to accommodate the flexible display 230 through structural coupling of the first housing 210 and the second housing 220. The recess 201 may have substantially the same size as the flexible display 230. According to an embodiment, because of the sensor area 231d, the recess 201 may have two or more different widths in a direction perpendicular to the folding axis (A axis). For example, the recess 201 may have a first width (W1) between the first portion 220a of the second housing 220 and the first portion 210a formed at the edge of the sensor area 231d of the first housing 210, and a second width (W2) formed by the second portion 220b of the second housing 220 and the second portion 210b that is not part of sensor area 231d of the first housing 210 and parallel to the folding axis (A axis). In this case, the second width (W2) may be formed to be longer than the first width (W1). For example, the recess 201 may be formed to have a first width (W1) formed from the first portion 210a of the first housing 210 having a mutually asymmetrical shape to the first portion 220a of the second housing 220, and it may be formed to have a second width (W2) formed from the second portion 210b of the first housing 210 having a mutually symmetrical shape to the second portion 220b of the second housing 220. According to an embodiment, the first portion 210a and the second portion 210b of the first housing 210 may be formed to have different distances from the folding axis (A axis). The width of the recess 201 may not be limited to the illustrated example. According to one or more embodiments, the recess 201 may have two or more different widths because of the shape of the sensor area 231d or the portion having the asymmetrical shape of the first housing 210 and the second housing 220.

According to one or more embodiments, at least a portion of the first housing 210 and the second housing 220 may be formed of a metal material or a non-metal material having rigidity to support the flexible display 230.

According to one or more embodiments, the sensor area 231d may be formed to have a predetermined area adjacent to one corner of the first housing 210. According to one or more embodiments of the present disclosure, the sensor area 231d may be disposed under the flexible display 230 or disposed inside the flexible display 230 so as not to be exposed to the outside of the foldable electronic device 200. The arrangement, shape, and size of the sensor area 231d may not be limited to the illustrated example. For example, the sensor area 231d may be provided at another corner or any arbitrary area between the upper corner and the lower corner of the first housing 210. According to an embodiment, the sensor area 231d may be disposed in at least a partial area of the second housing 220. The sensor area 231d may be disposed to extend to the first housing 210 and the second housing 220. According to an embodiment, the foldable electronic device 200 may include various components arranged to be exposed on the front side of the foldable electronic device 200 through the sensor area 213d or through one or more openings provided in the sensor area 231d. According to one or more embodiments, the various components may include, for example, at least one of a front camera device, a receiver, a proximity sensor, an illuminance sensor, an iris recognition sensor, an ultrasonic sensor, and an indicator.

According to one or more embodiments, the first rear surface cover 240 may be disposed on the second surface 212 of the first housing 210 and may have a substantially rectangular periphery. According to an embodiment, at least a portion of the edge may be surrounded by the first housing 210. The second rear surface cover 250 may be disposed on the fourth surface 222 of the second housing 220, and at least a portion of an edge thereof may be surrounded by the second housing 220.

According to one or more embodiments, the first rear surface cover 240 and the second rear surface cover 250 may have a substantially symmetrical shape with respect to the folding axis (A axis). The first rear surface cover 240 and the second rear surface cover 250 may include a variety of different shapes. According to an embodiment, the first rear surface cover 240 may be integrally formed with the first housing 210, and the second rear surface cover 250 may be integrally formed with the second housing 220.

According to one or more embodiments, the first rear surface cover 240, the second rear surface cover 250, the first housing 210, and the second housing 220 may provide a space, through a structure coupled to each other, in which various components (e.g., a printed circuit board, an antenna module, a sensor module, or a battery) of the foldable electronic device 200 may be disposed. According to an embodiment, one or more components may be disposed or visually exposed on the rear surface of the foldable electronic device 200. For example, one or more components or sensors may be visually exposed through the first rear surface area 241 of the first rear surface cover 240. According to an embodiment, the sensor may include a proximity sensor, a rear camera device, and/or a flash. According to an embodiment, at least a portion of the sub-display 252 may be visually exposed through the second back area 251 of the second rear surface cover 250.

According to one or more embodiments, the flexible display 230 may be disposed in a space formed by a pair of housings (e.g., the first housing 210 and the second housing 220). For example, the flexible display 230 may be seated in a recess 201 formed by a pair of housings (the first housing 210 and the second housing 220), and it may be placed to occupy most of the front surface of the foldable electronic device 200. According to an embodiment, the front surface of the foldable electronic device 200 may include a flexible display 230, a partial area (e.g., an edge area) of the first housing 210, and a partial area (e.g., an edge area) of the second housing 220 that are adjacent to the flexible display 230. According to an embodiment, the rear surface of the foldable electronic device 200 may include a first rear surface cover 240, a partial area (e.g., an edge area) of the first housing 210 adjacent to the first rear surface cover 240, a second rear surface cover 250, and a partial area (e.g., an edge area) of the second housing 220 adjacent to the second rear surface cover 250.

According to one or more embodiments, the flexible display 230 may mean a display in which at least a partial area may be deformed into a flat surface or a curved surface. According to an embodiment, the flexible display 230 may include a bending area 231c (e.g., a folding area), a first planar area 231a disposed on one side (e.g., a right area of the bending area 231c) with respect to the bending area 231c, and a second planar area 231b disposed on the other side (e.g., a left area of the bending area 231c). For example, the first planar area 231a may be disposed on the first surface 211 of the first housing 210, and the second planar area 231b may be disposed on the third surface 221 of the second housing 220. According to an embodiment, the division of areas of the flexible display 230 is exemplary, and the flexible display 230 may be divided into a plurality (e.g., four or more, or two) of areas according to a structure or function. According to an embodiment, in the embodiment shown in FIG. 2A, the area of the flexible display 230 may be divided by the bending area 231c extending parallel to the y-axis or the folding axis (A-axis), but the flexible display 230 may also be divided into areas on the basis of another bending area (e.g., a folding area parallel to the x-axis) or another folding axis (e.g., a folding axis parallel to the x-axis). According to an embodiment, the division of the area of the flexible display 230 is only a physical division by a pair of housings (the first housing 210 and the second housing 220) and a hinge module (e.g., the hinge module 264 of FIG. 2C), and substantially one full screen may be displayed on the flexible display 230 through a pair of housings (the first housing 210 and the second housing 220) and a hinge module (e.g., the hinge module 264 of FIG. 2C). According to an embodiment, the first planar area 231a and the second planar area 231b may have an overall symmetrical shape with respect to the bending area 231c. According to an embodiment, the first planar area 231a, unlike the second planar area 231b, may be a notch area (e.g., the notch area 233 of FIG. 2C) cut according to the presence of the sensor area 231d, but it may have a symmetrical shape with respect to the second planar area 231b in other areas. For example, the first planar area 231a and the second planar area 231b may include a portion having a shape symmetrical to each other and a portion having a shape asymmetrical to each other. According to an embodiment, in the case that the sensor area 231d is disposed below (e.g., −Z direction) the flexible display 230 or disposed inside the flexible display 230, the first planar area 231a and the second planar area 231b may have a substantially symmetrical shape with respect to the bending area 231c, in accordance with the notch area 233 being omitted.

According to one or more embodiments, in the case that the flexible display 230 is in the folded or unfolded state, a space (e.g., air gap) may be formed in at least a portion of the lower portion of the bending area 231c (e.g., the folding area) that does not contact with the first housing 210 and the second housing 220. An elastic member to be described later may be provided in the space formed under the bending area 130c.

With reference to FIG. 2B, the foldable electronic device 200 may include a hinge cover 265. The hinge cover 265 may be disposed between the first housing 210 and the second housing 220, and it may be configured to cover an internal component (e.g., the hinge module 264 of FIG. 2C). According to an embodiment, the hinge cover 265 may be covered by a part of the first housing 210 and the second housing 220 or exposed to the outside in accordance with an operating state (e.g., the unfolding state or the folding state) of the foldable electronic device 200. For example, the hinge cover 265 may be disposed so that it may support a hinge module (e.g., the hinge module 264 of FIG. 2C); be exposed to the outside in the case that the foldable electronic device 200 is in a folded state; and, in an unfolded state, be substantially invisible from the outside by being disposed in the first space (e.g., the internal space of the first housing 210) and the second space (e.g., the internal space of the second housing 220).

According to one or more embodiments, as shown in FIG. 2A, in the case that the foldable electronic device 200 is in an unfolded state, the hinge cover 265 may not be exposed by being covered by the first housing 210 and the second housing 220. As shown in FIG. 2B, in the case that the foldable electronic device 200 is in a folded state, the hinge cover 265 may be exposed to the outside between the first housing 210 and the second housing 220. According to an embodiment, in the case that the first housing 210 and the second housing 220 are in an intermediate state that is folded with a predetermined angle, the hinge cover 265 may be at least partially exposed to the outside of the foldable electronic device 200. In this case, the exposed area may be smaller than that of the fully folded state of the foldable electronic device 200. According to an embodiment, the hinge cover 265 may include a curved space.

According to one or more embodiments, in the case that the foldable electronic device 200 is in an unfolded state (e.g., FIG. 2A), the first housing 210 and the second housing 220 may form substantially an angle of about 180°, and the first planar area 231*a* and the second planar area 231*b* of the flexible display 230 may be disposed to face the same direction (e.g., horizontal). In this case, the bending area 231*c* may form substantially the same plane as the first planar area 231*a* and the second planar area 231*b*.

According to one or more embodiments, in the case that the foldable electronic device 200 is in a folded state (e.g., the state of FIG. 2B), the first housing 210 and the second housing 220 may be disposed to face each other. The first planar area 231*a* and the second planar area 231*b* of the flexible display 230 may face each other while forming a predetermined angle (e.g., between about 0° and 10°). In this case, at least a portion of the bending area 231*c* may be bent to have a predetermined curvature.

According to one or more embodiments, in the case that the foldable electronic device 200 is in an intermediate state, the first housing 210 and the second housing 220 may be disposed at a predetermined angle (e.g., between about 85° and about 95°) to each other. The first planar area 231*a* and the second planar area 231*b* of the flexible display 230 may form an angle larger than that in the folded state and smaller than that in the unfolded state. At least a portion of the bending area 231*c* may be bent to have a predetermined curvature. In this case, the curvature of the bending area 231*c* may be smaller than that in the folded state.

With reference to FIG. 2C, the foldable electronic device 200 according to one or more embodiments of the present disclosure may include a flexible display 230, a support member assembly 260, at least one printed circuit board 270, a first housing 210, a second housing 220, a first rear surface cover 240, and a second rear surface cover 250.

According to one or more embodiments, the flexible display 230 may include a display panel 231 and at least one plate 232 or layer on which the display panel 231 is mounted. According to an embodiment, at least one plate 232 may be disposed between the display panel 231 and the support member assembly 260. A display panel 231 may be disposed on at least a portion of one surface of the plate 232. The plate 232 may be formed in a shape corresponding to the display panel 231. For example, a partial area of the plate 232 may be formed in a shape corresponding to the notch area 233 of the display panel 231.

According to one or more embodiments, the support member assembly 260 may include a first support member 261, a second support member 262, a hinge module 264 disposed between the first support member 261 and the second support member 262, a hinge cover 265 that covers the hinge module 264, and a wiring member 263 (e.g., a flexible printed circuit board (FPCB)) crossing the first support member 261 and the second support member 262.

According to one or more embodiments, the support member assembly 260 may be disposed between at least one plate 232 and at least one printed circuit board 270. According to an embodiment, the first support member 261 may be disposed between the first planar area 231*a* of the flexible display 230 and the first printed circuit board 271. The second support member 262 may be disposed between the second planar area 231*b* of the flexible display 230 and the second printed circuit board 272. According to an embodiment, at least a portion of the wiring member 263 and the hinge module 264 may be disposed inside the support member assembly 260. The wiring member 263 may be disposed in a direction crossing the first support member 261 and the second support member 262 (e.g., the x-axis direction). The wiring member 263 may be disposed in a direction (e.g., the x-axis direction) perpendicular to the folding axis (e.g., the y-axis or the A-axis of FIG. 2A) of the bending area 231*c*.

According to one or more embodiments, at least one printed circuit board 270 may include a first printed circuit board 271 disposed on the first support member 261 side and a second printed circuit board 272 disposed on the second support member 262 side. The first printed circuit board 271 and the second printed circuit board 272 may be disposed inside the space formed by a support member assembly 260, a first housing 210, a second housing 220, a first rear surface cover 240, and a second rear surface cover 250. The components (e.g., a processor and a memory) for implementing various functions of the foldable electronic device 200 may be mounted to the first printed circuit board 271 and the second printed circuit board 272.

According to one or more embodiments, the first housing 210 and the second housing 220 may be assembled to each other so that they may be coupled to both sides of the support member assembly 260 in a state that the flexible display 230 is coupled to the support member assembly 260. As will be described later, the first housing 210 and the second housing 220 may be coupled to the support member assembly 260 by sliding from both sides of the support member assembly 260.

According to one or more embodiments, as the first housing 210 and the second housing 220 rotate through the hinge module 264, the first support member 261 and the second support member 262 may rotate to correspond thereto. According to an embodiment, the first housing 210 may include a first rotation support surface 214, and the second housing 220 may include a second rotation support surface 224 corresponding to the first rotation support surface 214. The first rotation support surface 214 and the second rotation support surface 224 may include curved surfaces corresponding to the curved surfaces included in the hinge cover 265. According to an embodiment, the first rotation support surface 214 and the second rotation support surface 224 may cover the hinge cover 265, in the case that the foldable electronic device 200 is in an unfolded state (e.g., the state of FIG. 2A), so that the hinge cover 265 is not exposed or minimally exposed to the rear side of the foldable electronic device 200. According to an embodiment, the first rotation support surface 214 and the second rotation support surface 224 may enable the hinge cover 265 to be exposed to the rear side of the foldable electronic device 200, in a state that the foldable electronic device is in a folded state (e.g., the state of FIG. b), by rotating along the curved surface included in the hinge cover 265.

The foldable electronic device 200 according to the illustrated embodiment may be an in-folding type electronic device where the flexible display 230 is folded in an inward direction facing itself so that the flexible display 230 may not be exposed to the outside of the foldable electronic device 200 in the folded state. In another embodiment, the foldable electronic device 200 may be an out-folding type electronic device where the flexible display 230 is folded in an outward direction so that the flexible display 230 is visually exposed to the outside of the foldable electronic device 200 in the folded state. In another embodiment, the foldable electronic device 200 may be a multi-folding type electronic device in which in-folding and out-folding are combined.

Figure 3A:
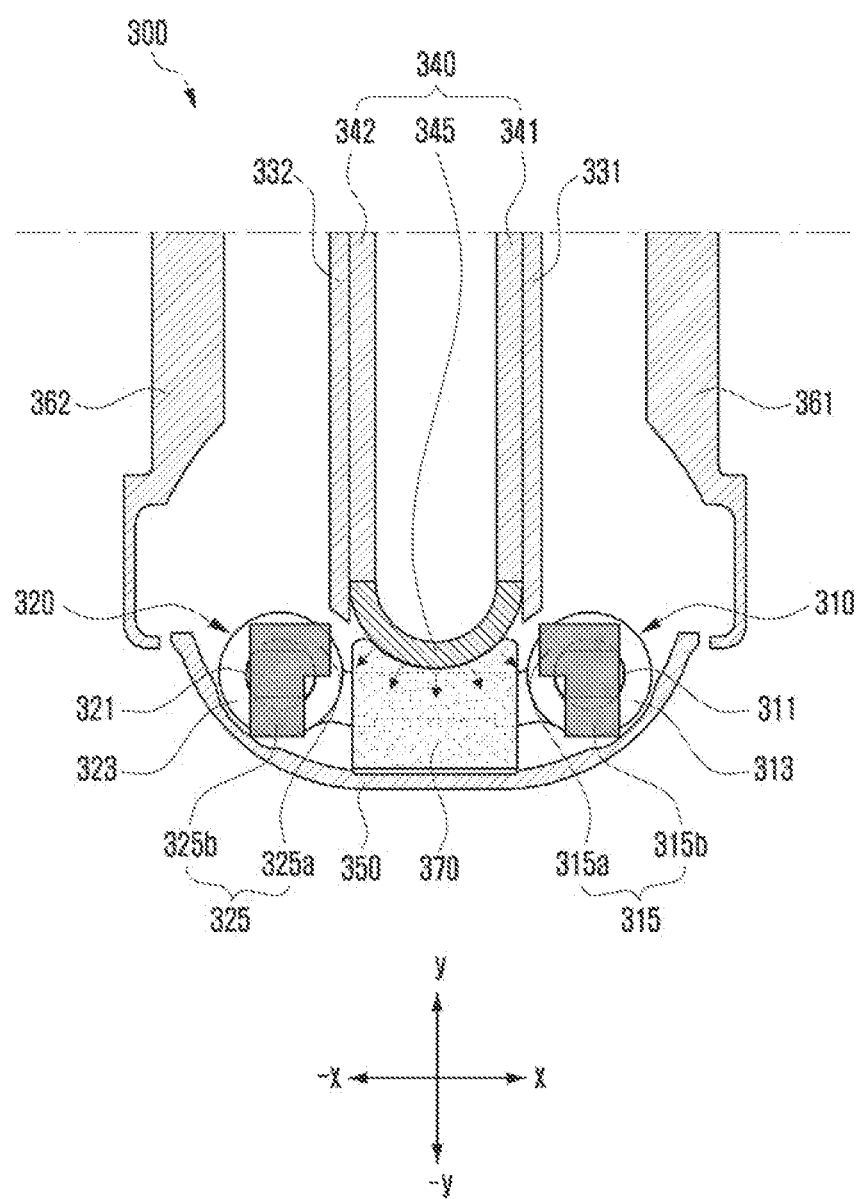
FIG. 3A illustrates a partial constitution of a foldable electronic device including a first hinge module and a second hinge module in a folded state according to an embodiment of the present disclosure.

FIG. 3A is a cross-sectional view schematically illustrating a partial configuration of a foldable electronic device including a first hinge module and a second hinge module in a folded state according to an embodiment of the present disclosure.

FIG. 3A may be a schematic cross-sectional view of an area F of the foldable electronic device 100 illustrated in FIG. 1D that is viewed from one direction (e.g., a y-axis direction). FIG. 3A may be a schematic cross-sectional view of an area G of the foldable electronic device 200 illustrated in FIG. 2B that is viewed from one direction (e.g., a right direction).

Figure 3B:
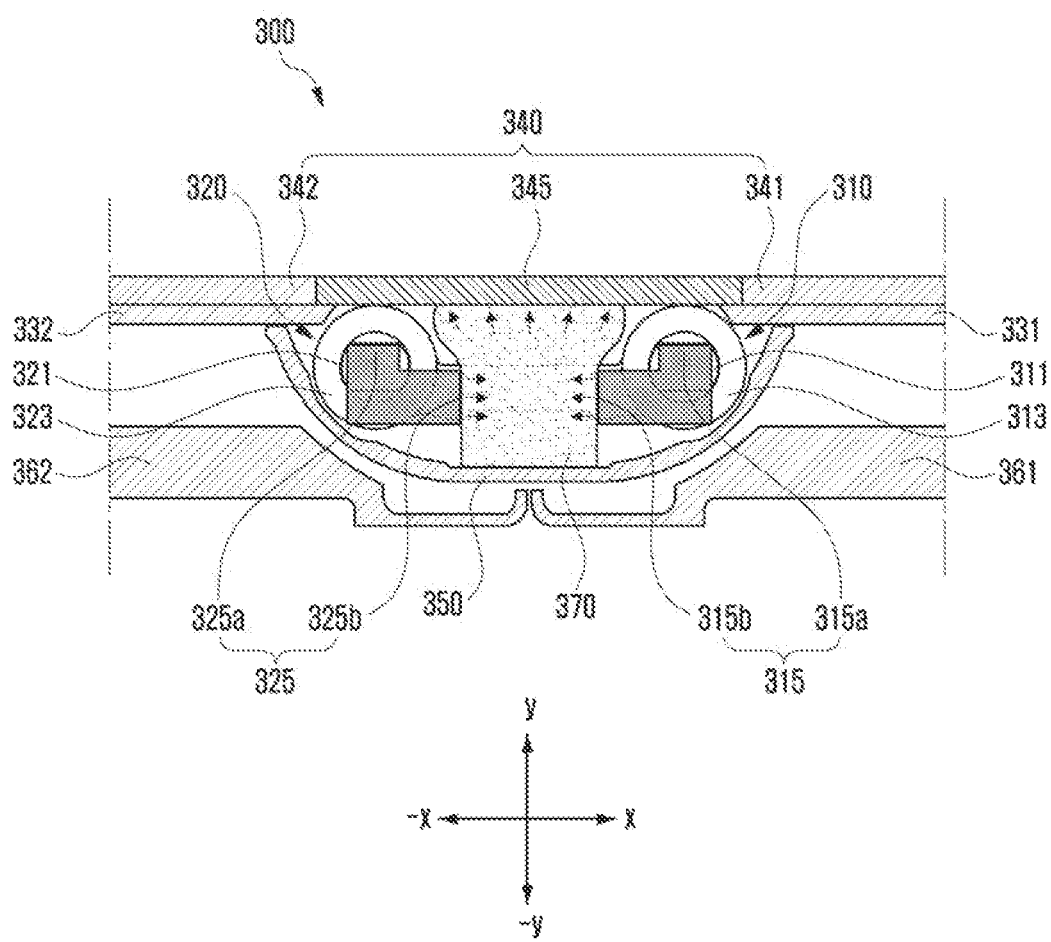
FIG. 3B illustrates a partial constitution of a foldable electronic device including a first hinge module and a second hinge module in an unfolded state according to an embodiment of the present disclosure.

FIG. 3B is a cross-sectional view schematically illustrating a partial configuration of a foldable electronic device including a first hinge module and a second hinge module in an unfolded state according to an embodiment of the present disclosure.

FIG. 3B may be a schematic cross-sectional view of an area F' of the foldable electronic device 100 illustrated in FIG. 1B that is viewed from one direction (e.g., a right direction). FIG. 3B may be a schematic cross-sectional view of an area G' of the foldable electronic device 200 illustrated in FIG. 2A that is viewed from one direction (e.g., a y-axis direction).

According to one or more embodiments, the embodiments of the foldable electronic device 300 illustrated in FIGS. 3A and 3B may include the embodiments illustrated in FIGS. 1A to 1E and FIGS. 2A to 2C. The foldable electronic device 300 shown in FIGS. 3A and 3B may include a foldable electronic device 100 (e.g., a Z flip, a vertical folding type) shown in FIGS. 1A to 1E, a foldable electronic device 200 (e.g., a foldable phone, a horizontal folding type) shown in FIGS. 2A to 2C, and/or a multi-foldable electronic device.

Regarding FIGS. 3A and 3B, redundant descriptions of the same configurations and functions as those of the embodiment illustrated in FIGS. 1A to 1E and 2A to 2C described above may be omitted.

With reference to FIGS. 3A and 3B, a foldable electronic device 300 according to one or more embodiments of the present disclosure may include a first hinge module 310, a first pressing part 315, a second hinge module 320, a second pressing part 325, a first support member 331, a second support member 332, a flexible display 340, a hinge cover 350, a first housing 361, a second housing 362, and/or elastic member 370.

According to one or more embodiments, the first hinge module 310 may be connected to at least a portion of the first pressing part 315. The first hinge module 310 may rotate the first pressing part 315 according to the folded or unfolded state of the foldable electronic device 300. The first hinge module 310 may be connected to at least a portion of the first support member 331. The first hinge module 310 may be connected to at least a portion of the first housing 361. As the first hinge module 310 rotates, the first support member 331 and the first housing 361 may also rotate.

According to an embodiment, in the foldable electronic device 300, in the case that external pressure is transmitted to the first housing 361, the external pressure is transmitted to the first support member 331 coupled to the first housing 361, and the first hinge module 310 connected to the first support member 331 rotates because of the external pressure, so that the foldable electronic device 300 may be operated in a folded or unfolded state.

According to an embodiment, the first hinge module 310 may include a first shaft 311 and a first driving unit 313. The first shaft 311 may form a central axis of the first hinge module 310. The first driving unit 313 may be configured to surround at least a portion of the outside of the first shaft 311. The first driving unit 313 may be coupled to the first shaft 311. The first shaft 311 may be connected to at least a portion of the first pressing part 315.

According to an embodiment, the first hinge module 310 may include the hinge module 140 illustrated in FIG. 1B or the hinge module 264 illustrated in FIG. 2C.

According to one or more embodiments, the first pressing part 315 may have a predetermined shape. The first pressing part 315 may include a first end 315*a* and a second end 315*b* connected from the first end 315*a*. The first end 315*a* may be connected to the first hinge module 310 (e.g., the first shaft 311 and/or the first driving unit 313). The first pressing part 315 may be connected from the first end 315*a*; and the second end 315*b*, at least a part of which is extended to the outside of the first hinge module 310, may press the first side surface of the elastic member 370 in accordance with the rotation of the first hinge module 310. The second end 315*b* of the first pressing part 315 may be substantially flat. The second end 315*b* of the first pressing part 315 may include a curved surface.

According to an embodiment, the first pressing part 315, as shown in FIG. 3A, may be disposed so that the second end 315*b* may not press the first side surface of the elastic member 370 in the case that the foldable electronic device 300 is in a folded state. For example, in the case that the foldable electronic device 300 is in a folded state, the second end 315*b* of the first pressing part 315 may be spaced apart from the elastic member 370 so as not to press the first side surface of the elastic member 370.

According to an embodiment, the first pressing part 315, as shown in FIG. 3B, may be disposed so that the second end 315*b* may press the first side surface of the elastic member 370 in the case that the foldable electronic device 300 is in an unfolded state. For example, in the case that the foldable electronic device 300 is in an unfolded state, the second end 315*b* of the first pressing part 315 may be disposed to contact and press the first side surface of the elastic member 370.

According to one or more embodiments, the second hinge module 320 may be connected to at least a portion of the second pressing part 325. The second hinge module 320 may rotate the second pressing part 325 according to the folded or unfolded state of the foldable electronic device 300. The second hinge module 320 may be connected to at least a portion of the second support member 332. The second hinge module 320 may be connected to at least a portion of the second housing 362. As the second hinge module 320 rotates, the second support member 332 and the second housing 362 may also rotate.

According to an embodiment, in the foldable electronic device 300, in the case that external pressure is transmitted to the second housing 362, the external pressure is transmitted to the second support member 332 coupled to the second housing 362, and the second hinge module 320 connected to the second support member 332 rotates because of the external pressure, so that the foldable electronic device 300 may be operated in a folded or unfolded state.

According to an embodiment, the second hinge module 320 may include a second shaft 321 and a second driving unit 323. The second shaft 321 may form a central axis of the second hinge module 320. The second driving unit 323 may be configured to surround at least a portion of the outside of the second shaft 321. The second driving unit 323 may be coupled to the second shaft 321. The second shaft 321 may be connected to at least a portion of the second pressing part 325.

According to an embodiment, the second hinge module 320 may include the hinge module 140 illustrated in FIG. 1B or the hinge module 264 illustrated in FIG. 2C.

According to one or more embodiments, the second pressing part 325 may have a predetermined shape. The second pressing part 325 may include a first end 325a and a second end 325b connected from the first end 325a. The first end 325a may be connected to the second hinge module 320 (e.g., the second shaft 321 and/or the second driving unit 323). The second pressing part 325 may be connected from the first end 325a; and the second end 325b, at least a part of which is extended to the outside of the second hinge module 320, may press the second side surface of the elastic member 370 in accordance with the rotation of the second hinge module 320. The second end 325b of the second pressing part 325 may be substantially flat. The second end 325b of the second pressing part 325 may include a curved surface.

According to an embodiment, the second pressing part 325, as shown in FIG. 3A, may be disposed so that the second end 325b may not press the second side surface of the elastic member 370 in the case that the foldable electronic device 300 is in a folded state. For example, in the case that the foldable electronic device 300 is in a folded state, the second end 325b of the second pressing part 325 may be disposed away from the elastic member 370 so as not to press the second side surface of the elastic member 370.

According to an embodiment, the second pressing part 325, as shown in FIG. 3B, may be disposed so that the second end 325b may press the second side surface of the elastic member 370 in the case that the foldable electronic device 300 is in an unfolded state. For example, in the case that the foldable electronic device 300 is in an unfolded state, the second end 325b of the second pressing part 325 may be disposed to contact and press the second side surface of the elastic member 370.

According to one or more embodiments, in the case that the foldable electronic device 300 is in a folded state (e.g., FIG. 3A), the first pressing part 315 and the second pressing part 325 may be disposed so as not to press the first side surface and the second side surface of the elastic member 370 in accordance with the rotation of the first hinge module 310 and the second hinge module 320. In this case, the elastic member 370 may be pressed from an upper portion (e.g., y-axis) by the bending area 345 of the flexible display 340, be contracted in a lower direction (e.g., −y-axis), and be deformed to expand in left and right directions (e.g., −x-axis, x-axis).

According to one or more embodiments, in the case that the foldable electronic device 300 is in an unfolded state (e.g., FIG. 3B), the first pressing part 315 and the second pressing part 325 may be disposed to press the first side surface and the second side surface of the elastic member 370 in accordance with the rotation of the first hinge module 310 and the second hinge module 320. In this case, the elastic member 370 may support the bending area 345 of the flexible display 340 by being contracted in left and right directions (e.g., −x-axis, x-axis) and being deformed to expand in an upper direction (e.g., y-axis).

According to one or more embodiments, the first support member 331 may support the first planar area 341 of the flexible display 340. The first support member 331 may be connected to at least a portion of the first hinge module 310. The first support member 331 may rotate to correspond to the rotation of the first hinge module 310.

According to an embodiment, the first support member 331 may include the first support member 261 illustrated in FIG. 2C.

According to one or more embodiments, the second support member 332 may support the second planar area 342 of the flexible display 340. The second support member 332 may be connected to at least a portion of the second hinge module 320. The second support member 332 may rotate to correspond to the rotation of the second hinge module 320.

According to an embodiment, the second support member 332 may include the second support member 262 shown in FIG. 2C.

According to one or more embodiments, the flexible display 340 may include a first planar area 341, a second planar area 342, and a bending area 345 (e.g., folding area) connecting the first planar area 341 and the second planar area 342. The first planar area 341 may be disposed on the first support member 331. The second planar area 342 may be disposed on top of the second support member 332. The bending area 345 may be disposed on top of the elastic member 370.

According to an embodiment, in the case that the foldable electronic device 300 is in a folded state (e.g., FIG. 3A), the bending area 345 may be bent to press the upper portion of the elastic member 370, and it may deform the elastic member 370 to be contracted in a downward direction.

According to an embodiment, the flexible display 340 may include the flexible display 130 illustrated in FIGS. 1A, 1B, and 1E. The first planar area 341, the second planar area 342, and the bending area 345 may include the first planar area 130a, the second planar area 130b and the bending area 130c illustrated in FIG. 1B, respectively.

According to an embodiment, the flexible display 340 may include the flexible display 230 illustrated in FIGS. 2A and 2C. The first planar area 341, the second planar area 342, and the bending area 345 may include the first planar area 231a, the second planar area 231b, and the bending area 231c illustrated in FIG. 2C, respectively.

According to one or more embodiments, the hinge cover 350 (e.g., a hinge housing) may support and cover the first hinge module 310 and the second hinge module 320. The hinge cover 350 may be exposed to the outside in the case that the foldable electronic device 300 is in a folded state (e.g., FIG. 3A). In the case that the foldable electronic device 300 is in an unfolded state (e.g., FIG. 3B), the hinge cover 350 may be drawn into the inner space of the first housing 361 and the inner space of the second housing 362, and it may not be exposed to the outside.

According to an embodiment, the hinge cover 350 may be disposed between the first housing 361 and the second housing 362. The hinge cover 350 may protect the first hinge module 310 and the second hinge module 320. In the case that the first housing 361 and the second housing 362 are in an intermediate state forming a predetermined angle, the hinge cover 350 may be at least partially exposed to the outside of the foldable electronic device 300 between the first housing 361 and the second housing 362. The hinge cover 350 may include a curved surface.

According to an embodiment, the hinge cover 350 may include the hinge cover 141 illustrated in FIG. 1D. The hinge cover 350 may include the hinge cover 265 illustrated in FIGS. 2B and 2C.

According to one or more embodiments, the first housing 361 may be connected to at least a portion of the first hinge module 310. As the first housing 361 rotates at a predetermined angle, the first hinge module 310 may also rotate.

According to one or more embodiments, the second housing 362 may be connected to at least a portion of the second hinge module 320. As the second housing 362 rotates at a predetermined angle, the second hinge module 320 may also rotate.

According to an embodiment, the first housing 361 and the second housing 362 may rotate correspondingly as the first support member 331 and the second support member 332 rotate through the first hinge module 310 and the second hinge module 320.

According to an embodiment, the first housing 361 and the second housing 362 may include the first housing 110 and the second housing 120 illustrated in FIGS. 1A to 1E, respectively. The first housing 361 and the second housing 362 may include the first housing 210 and the second housing 220 illustrated in FIGS. 2A to 2C, respectively.

According to an embodiment, in the case that the foldable electronic device 300 is in a folded state (e.g., FIG. 3A), the first housing 361 and the second housing 362 may be disposed to face each other. In this case, the first planar area 341 and the second planar area 342 of the flexible display 340 may face each other while forming a predetermined angle (e.g., between about 0° and 10°). At least a portion of the bending area 345 may be bent to have a predetermined curvature.

According to an embodiment, in the case that the foldable electronic device 300 is in an intermediate state, the first housing 361 and the second housing 362 may be disposed at a predetermined angle (e.g., between about 85° and about 95°) to each other.

According to an embodiment, in the case that the foldable electronic device 300 is in an unfolded state (e.g., FIG. 3B), the first housing 361 and the second housing 362 may be formed to be at a substantially parallel angle (e.g., about 180°). In this case, the first planar area 341 and the second planar area 342 of the flexible display 340 may be disposed to face the same direction (e.g., horizontal). The bending area 345 may be substantially coplanar with the first planar area 341 and the second planar area 342.

According to one or more embodiments, the elastic member 370 may be provided in a space (e.g., an air gap) formed between the bending area 345 (e.g., a folding area) of the flexible display 340 and the hinge cover 350. The elastic member 370 may be disposed between the bending area 345 of the flexible display 340 and the hinge cover 350. The elastic member 370 may be disposed between the first hinge module 310 and the second hinge module 320. The upper surface of the elastic member 370 may contact the lower surface of the bending area 345. The lower surface of the elastic member 370 may contact the upper surface of the hinge cover 350.

According to an embodiment, the elastic member 370 may be made of a material having high thermal conductivity. The flexible display 340 may include a first planar area 341, a second planar area 342, and a bending area 345. In the case that a temperature change occurs outside of the foldable electronic device 300, the elastic member 370 made of a material having high thermal conductivity may prevent damage (e.g., crack) of the flexible display 340 by reducing the temperature deviation among areas (e.g., a first planar area 341, a second planar area 342, and a bending area 345). The elastic member 370 will be described in detail in FIGS. 6A to 10.

According to an embodiment, the elastic member 370 may be disposed on at least a part of the foldable electronic device 300. For example, the elastic member 370 may be configured to be disposed on at least a part or the entire area of the folding axis (A axis) illustrated in FIGS. 1A to 1E and 2A. At least one of the first hinge module 310, the first pressing part 315, the second hinge module 320, and/or the second pressing part 325 of the foldable electronic device 300 may be disposed. For example, the first pressing part 315 and the second pressing part 325 may be disposed at both ends of the first hinge module 310 or the second hinge module 320.

According to an embodiment, in the case that the foldable electronic device 300 is in a folded state (e.g., FIG. 3A), as the second end 315*b* of the first pressing part 315 connected to the first hinge module 310 and the second end 325*b* of the second pressing part 325 connected to the second hinge module 320 are each in a state of not pressing the elastic member 370, the first side surface and the second side surface of the elastic member 370 may not be pressed. In this case, the upper portion of the elastic member 370 may be pressed by the bending area 345 and it may be deformed to be contracted in a lower direction (e.g., −y axis).

According to an embodiment, in the case that the foldable electronic device 300 is in an unfolded state (e.g., FIG. 3B), as the second end 315*b* of the first pressing part 315 connected to the first hinge module 310 and the second end 325*b* of the second pressing part 325 connected to the second hinge module 320 are each in a state of pressing the elastic member 370, the first side surface and the second side surface of the elastic member 370 may be pressed. In this case, the elastic member 370 may support the bending area 345 by being contracted in left and right directions (e.g., −x-axis, x-axis) and being deformed to expand in an upper direction (e.g., y-axis).

Figure 4A:
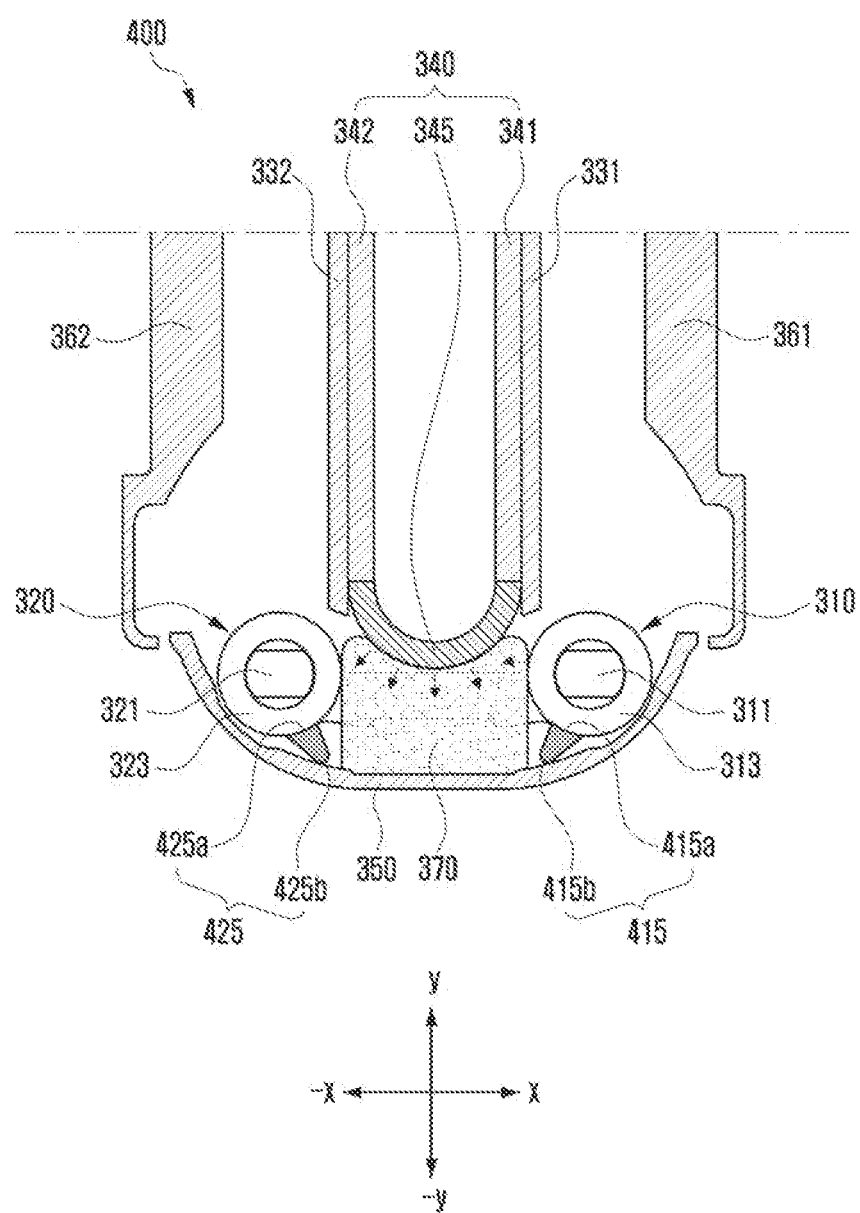
FIG. 4A illustrates a partial constitution of a foldable electronic device including a first hinge module and a second hinge module in a folded state according to one or more embodiments of the present disclosure.

FIG. 4A is a cross-sectional view schematically illustrating a partial configuration of a foldable electronic device including a first hinge module and a second hinge module in a folded state according to one or more embodiments of the present disclosure FIG. 4A may be a schematic cross-sectional view of an area F of the foldable electronic device 100 illustrated in FIG. 1D that is viewed from one direction (e.g., a y-axis direction). FIG. 4A may be a schematic cross-sectional view of an area G of the foldable electronic device 200 illustrated in FIG. 2B that is viewed from one direction (e.g., a right direction).

Figure 4B:
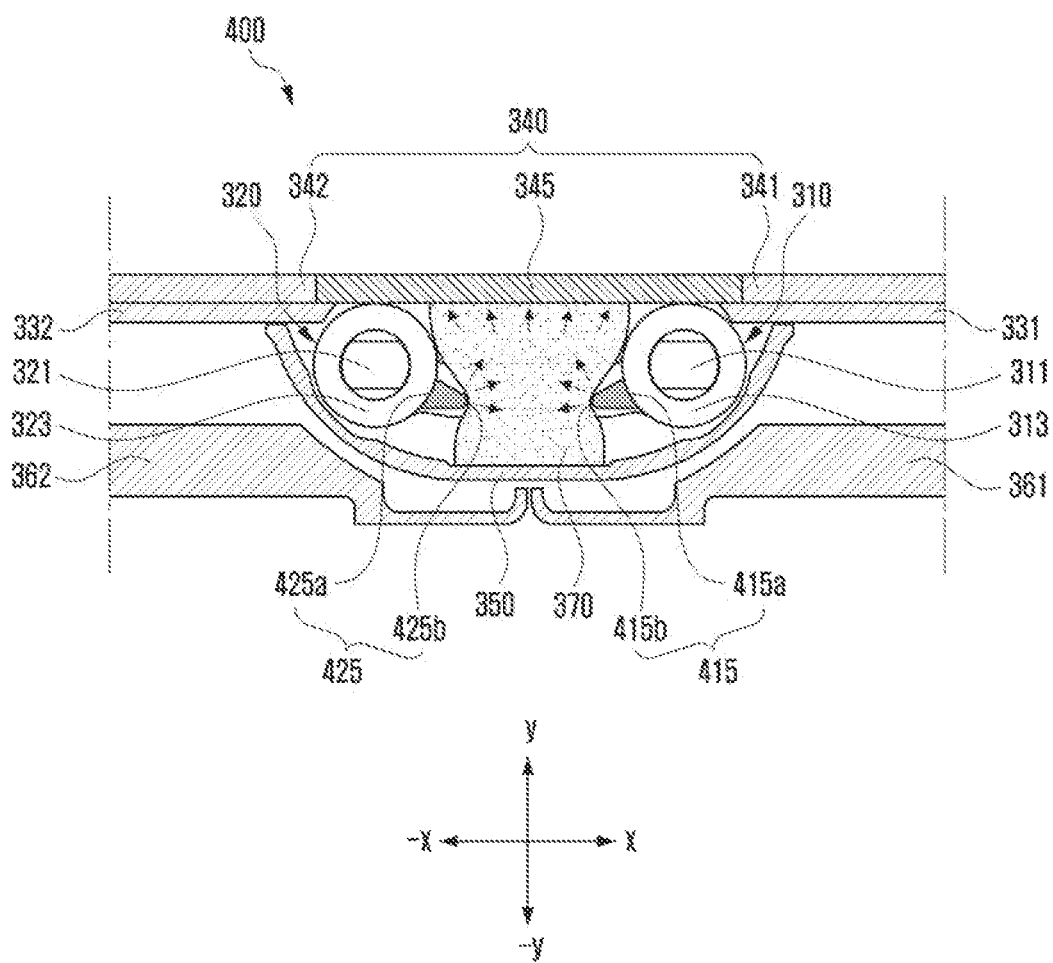
FIG. 4B illustrates a partial constitution of a foldable electronic device including a first hinge module and a second hinge module in an unfolded state according to one or more embodiments of the present disclosure.

FIG. 4B is a cross-sectional view schematically illustrating a partial configuration of a foldable electronic device including a first hinge module and a second hinge module in an unfolded state according to one or more embodiments of the present disclosure.

FIG. 4B may be a schematic cross-sectional view of an area F' of the foldable electronic device 100 illustrated in FIG. 1B that is viewed from one direction (e.g., a right direction). FIG. 4B may be a schematic cross-sectional view of an area G' of the foldable electronic device 200 illustrated in FIG. 2A that is viewed from one direction (e.g., y-axis direction).

According to one or more embodiments, the embodiments of the foldable electronic device 400 illustrated in FIGS. 4A and 4B may include the embodiments illustrated in FIGS. 1A to 1E and 2A to 2C. The foldable electronic device 400 shown in FIGS. 4A and 4B may include a foldable electronic device 100 (e.g., a Z flip, a vertical folding type) shown in FIGS. 1A to 1E, a foldable electronic device 200 (e.g., a foldable phone, a horizontal folding type), and/or a multi-foldable electronic device.

According to one or more embodiments, the embodiments of the foldable electronic device 400 illustrated in FIGS. 4A and 4B may include the embodiments illustrated in FIGS. 3A and 3B. The foldable electronic device 400 illustrated in FIGS. 4A and 4B may include the foldable electronic device 300 illustrated in FIGS. 3A and 3B.

Regarding FIGS. 4A and 4B, redundant descriptions of the same configurations and functions as those of the embodiment shown in FIGS. 3A and 3B described above may be omitted.

With reference to FIGS. 4A and 4B, a foldable electronic device 400 according to one or more embodiments of the present disclosure may include a first hinge module 310, a first pressing part 415, a second hinge module 320, a second pressing part 425, a first support member 331, a second support member 332, a flexible display 340, a hinge cover 350, a first housing 361, a second housing 362, and/or elastic member 370.

According to one or more embodiments, the foldable electronic device 400 shown in FIGS. 4A and 4B may be disposed at substantially the same location and perform substantially the same function as a first hinge module 310, a second hinge module 320, a first support member 331, a second support member 332, a flexible display 340, a hinge cover 350, a first housing 361, a second housing 362, and an elastic member 370 of the foldable electronic device 400 shown in FIGS. 3A and 3B.

According to one or more embodiments, in the foldable electronic device 400 illustrated in FIGS. 4A and 4B, each of the first pressing part 415 and the second pressing part 425 may be formed in a pressing protrusion shape.

According to one or more embodiments, the first pressing part 415 may have a predetermined shape (e.g., a protrusion shape). The first pressing part 415 may include a first end 415a and a second end 415b connected from the first end 415a. The first end 415a may be connected to the first hinge module 310 (e.g., the first driving unit 313). The first pressing part 415 may be connected from the first end 415a, and a second end 415b of which at least a portion extends to the outside of the first hinge module 310 may press at least a portion (e.g., the lower portion) of the first side surface of the elastic member 370 in accordance with the rotation of the first hinge module 310. The second end 415b of the first pressing part 415 may be configured to have a curved surface.

According to an embodiment, the first pressing part 415, as shown in FIG. 4A, in the case that the foldable electronic device 400 is in a folded state, may be disposed toward the hinge cover 350 so that the second end 415b may not press at least a portion of the first side surface of the elastic member 370. The first pressing part 415, as shown in FIG. 4B, in the case that the foldable electronic device 400 is in an unfolded state, may be disposed so that the second end 415b may press at least a portion (e.g., the lower portion) of the first side surface of the elastic member 370 in accordance with the rotation of the first hinge module 310.

According to one or more embodiments, the second pressing part 425 may have a predetermined shape (e.g., a protrusion shape). The second pressing part 425 may include a first end 425a and a second end 425b connected from the first end 425a. The first end 425a may be connected to the second hinge module 320 (e.g., the second driving unit 323). The second pressing part 425 may be connected from the first end 425a, and a second end 425b of which at least a portion extends to the outside of the second hinge module 320 may press at least a portion (e.g., the lower portion) of the second side surface of the elastic member 370 in accordance with the rotation of the second hinge module 320. The second end 425b of the second pressing part 425 may be configured to have a curved surface.

According to an embodiment, the second pressing part 425, as shown in FIG. 4A, in the case that the foldable electronic device 400 is in a folded state, may be disposed toward the hinge cover 350 so that the second end 425b may not press at least a portion of the first side surface of the elastic member 370. The second pressing part 425, as shown in FIG. 4B, in the case that the foldable electronic device 400 is in an unfolded state, may be disposed so that the second end 425b may press at least a portion (e.g., the lower portion) of the second side surface of the elastic member 370 in accordance with the rotation of the second hinge module 320.

According to one or more embodiments, in the case that the foldable electronic device 400 is in a folded state (e.g., FIG. 4A), the first pressing part 415 and the second pressing part 425 may not press at least a portion of the first side surface and at least a portion of the second side surface of the elastic member 370 by being disposed toward the hinge cover 350 in accordance with the rotation of the first hinge module 310 and the second hinge module 320. In this case, the elastic member 370 may be pressed from an upper portion (e.g., y-axis) by the bending area 345 of the flexible display 340, be contracted in a lower direction (e.g., −y-axis), and be deformed to expand in left and right directions (e.g., −x-axis, x-axis).

According to one or more embodiments, in the case that the foldable electronic device 400 is in an unfolded state (e.g., FIG. 4B), the first pressing part 415 and the second pressing part 425 may be disposed to press so that at least a portion of the first side surface and at least a portion of the second side surface of the elastic member 370 may be pushed up in accordance with the rotation of the first hinge module 310 and the second hinge module 320. In this case, at least a portion of the elastic member 370 (e.g., the lower portion) may support the bending area 345 of the flexible display 340 by being contracted in left and right directions (e.g., −x-axis, x-axis) and being deformed to expand in an upper direction (e.g., y-axis).

According to an embodiment, in the case that the foldable electronic device 400 is in a folded state (e.g., FIG. 4A), the bending area 345 may be bent to press the upper portion of the elastic member 370, and it may deform the elastic member 370 to be contracted in a downward direction (e.g., −y axis)

According to an embodiment, the elastic member 370 may be disposed on at least a part of the foldable electronic device 400. For example, the elastic member 370 may be configured to be disposed on at least a part or the entire area of the folding axis (A axis) illustrated in FIGS. 1A to 1E and 2A. At least one of the first hinge module 310, the first pressing part 415, the second hinge module 320, and/or the second pressing part 425 of the foldable electronic device 400 may be disposed. For example, the first pressing part 415 and the second pressing part 425 may be disposed at both ends of the first hinge module 310 or the second hinge module 320.

According to one or more embodiments, the elastic member 370 may be disposed over the entire area of the folding axis (A axis) illustrated in FIGS. 1A to 1E and 2A, or it may be disposed on at least a part of the folding axis (A axis). In the case that the foldable electronic devices 300 and 400 are in an unfolded state (e.g., FIGS. 3B and 4B), a portion of the elastic member 370 where the first hinge module 310 and the second hinge module 320 are not disposed may also be raised and support the bending area 345 if at least a portion of the elastic member 370 is pressed through the first pressing part 315 and 415 and the second pressing part 325 and 425 connected respectively to the first hinge module 310 and the second hinge module 320 disposed at (at least) a portion of a folding axis (A axis).

According to one or more embodiments of the present disclosure, although it has been described that the foldable electronic device 300 and 400 includes the first hinge module 310 and the second hinge module 320, the present disclosure may not be limited thereto, and it may include various types of hinge module. For example, according to one or more embodiments of the present disclosure, the first hinge module 310 and the second hinge module 320 may be implemented as one hinge module.

Figure 5A:
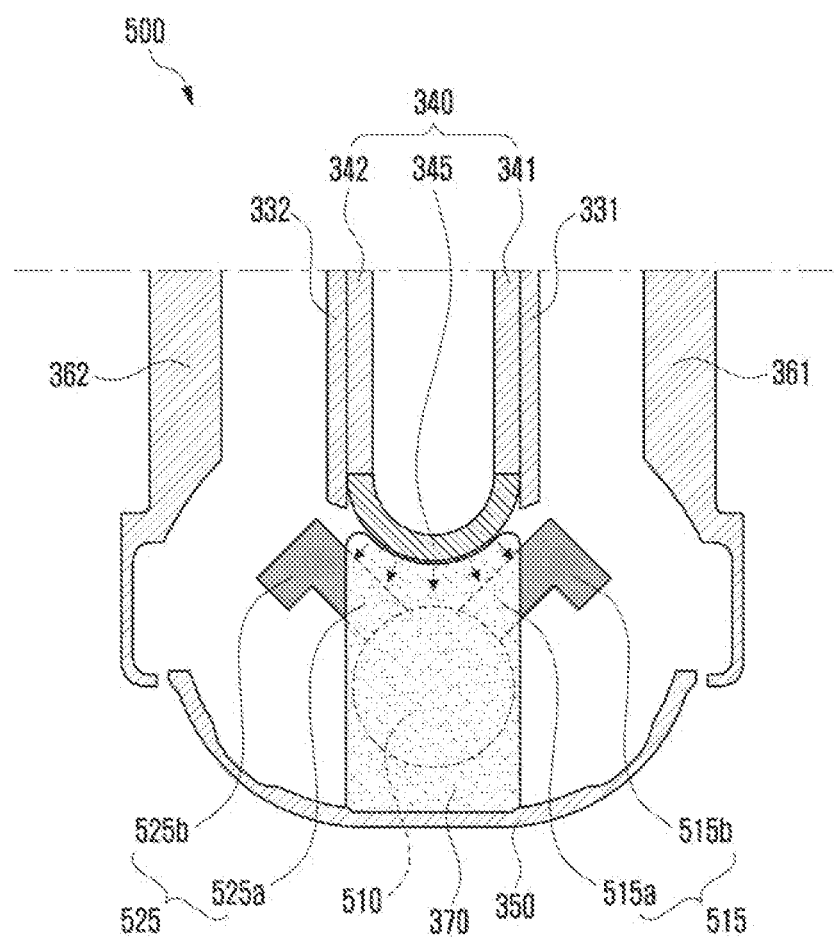
FIG. 5A illustrates a partial constitution of a foldable electronic device including a single hinge module in a folded state according to one or more embodiments of the present disclosure.

FIG. 5A is a cross-sectional view schematically illustrating a partial configuration of a foldable electronic device including a single hinge module in a folded state according to one or more embodiments of the present disclosure.

FIG. 5A may be a schematic cross-sectional view of an area F of the foldable electronic device 100 illustrated in FIG. 1D that is viewed from one direction (e.g., y-axis direction). FIG. 5A may be a schematic cross-sectional view of an area G of the foldable electronic device 200 illustrated in FIG. 2B that is viewed from one direction (e.g., a right direction).

Figure 5B:
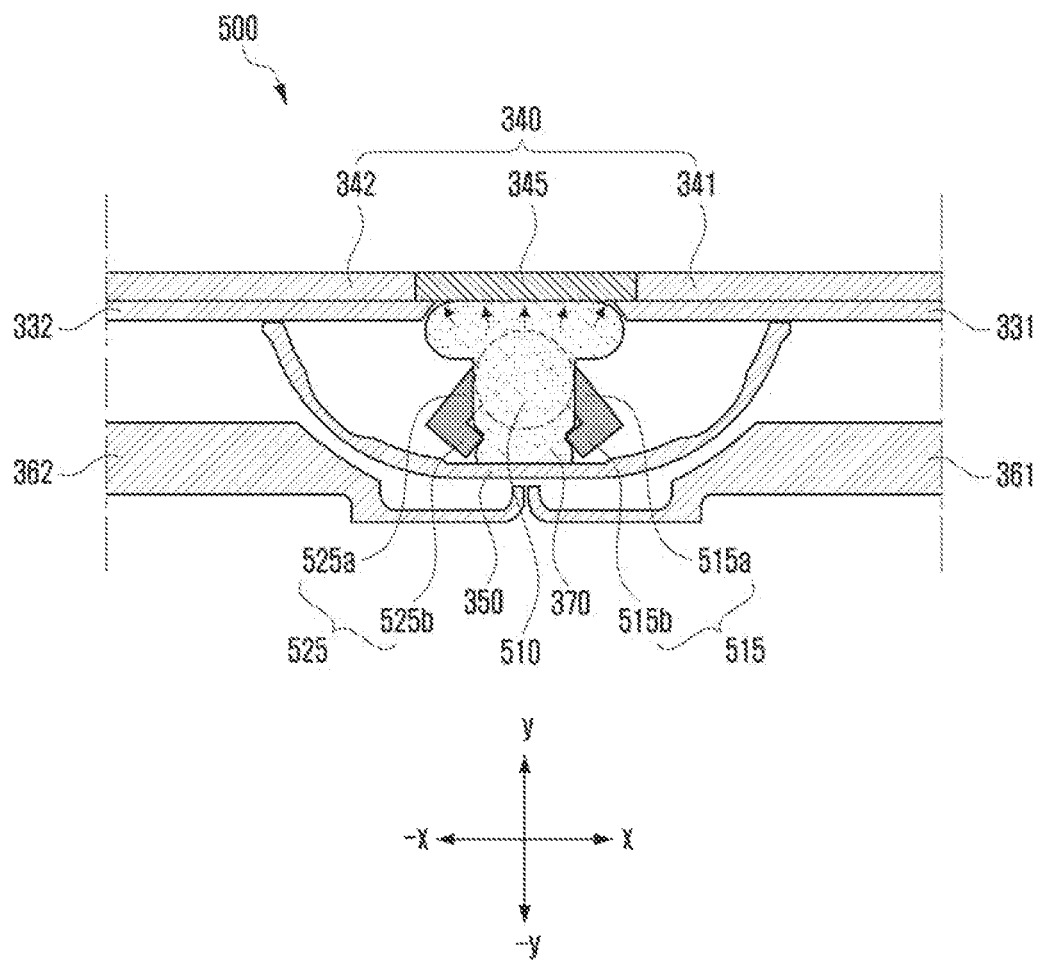
FIG. 5B illustrates a partial constitution of a foldable electronic device including a single hinge in an unfolded state according to one or more embodiments of the present disclosure.

FIG. 5B is a cross-sectional view schematically illustrating a partial configuration of a foldable electronic device including a single hinge in an unfolded state according to one or more embodiments of the present disclosure.

FIG. 5B may be a schematic cross-sectional view of an area F' of the foldable electronic device 100 illustrated in FIG. 1B that is viewed from one direction (e.g., a right direction). FIG. 5B may be a schematic cross-sectional view of an area G' of the foldable electronic device 200 illustrated in FIG. 2A that is viewed from one direction (e.g., a y-axis direction).

According to one or more embodiments, the embodiments of the foldable electronic device 500 illustrated in FIGS. 5A and 5B may include all or at least a portion of the embodiments disclosed in any one of FIGS. 1A to 1E, 2A to 2C, and 3A to 4B. The foldable electronic device 500 shown in FIGS. 5A and 5B may include the foldable electronic device 100 (e.g., a Z flip, a vertical folding type) shown in FIGS. 1A to 1E, the foldable electronic device 200 (e.g., a foldable phone, a horizontal folding type) shown in FIGS. 2A to 2C, and/or a multi-foldable electronic device.

Regarding FIGS. 5A and 5B, redundant descriptions of the same configurations and functions as those of the embodiment illustrated in FIGS. 3A to 4B described above may be omitted.

With reference to FIGS. 5A and 5B, a foldable electronic device 500 according to one or more embodiments of the present disclosure may include a hinge module 510, a first pressing part 515, a second pressing part 525, a first support member 331, a second support member 332, a flexible display 340, a hinge cover 350, a first housing 361, a second housing 362, and/or an elastic member 370.

According to one or more embodiments, the hinge module 510 may be connected to at least a portion of the first pressing part 515 (e.g., the first end 515a) and at least a portion of the second pressing part 525 (e.g., the first end 525a). The hinge module 510 may rotate the first pressing part 515 and/or the second pressing part 525 according to the folded or unfolded state of the foldable electronic device 500. The hinge module 510 may be connected to at least a portion of each of the first support member 331 and the second support member 332. The hinge module 510 may be connected to at least a portion of each of the first housing 361 and the second housing 362. As the hinge module 510 rotates, the first support member 331 and the second support member 332, or the first housing 361 and the second housing 362, each may also rotate.

According to an embodiment, the hinge module 510 may include the hinge module 140 illustrated in FIG. 1B or the hinge module 264 illustrated in FIG. 2C.

According to one or more embodiments, the first pressing part 515 may have a predetermined shape. The first pressing part 515 may include a first end 515a and a second end 515b connected from the first end 515a. The first end 515a may be connected to at least a portion of the hinge module 510. The first pressing part 515 may be connected from the first end 515a; and the second end 515b, at least a part of which is extended to the outside of the hinge module 510, may press the first side surface of the elastic member 370 in accordance with the rotation of the hinge module 510. The second end 515b of the first pressing part 515 may be substantially flat. The second end 515b of the first pressing part 515 may include a curved surface.

According to an embodiment, as shown in FIG. 5A, in the case that the foldable electronic device 500 is in a folded state, the second end 515b may be disposed so as not to press the first side surface of the elastic member 370. For example, in the case that the foldable electronic device 500 is in the folded state, the second end 515b of the first pressing part 515 may be disposed away from the elastic member 370 not to press the first side surface of the elastic member 370.

According to an embodiment, the first pressing part 515, as shown in FIG. 5B, in the case that the foldable electronic device 500 is in an unfolded state, may be disposed so that the second end 515b may press the first side surface of the elastic member. For example, in the case that the foldable electronic device 500 is in an unfolded state, the second end 515b of the first pressing part 515 may be disposed to contact and press the first side of the elastic member 370.

According to one or more embodiments, the second pressing part 525 may have a predetermined shape (e.g., approximately r shape). The second pressing part 525 may include a first end 525a and a second end 525b connected from the first end 525a. The first end 525a may be connected to at least a portion of the hinge module 510. The second pressing part 525 may be connected from the first end 525a; and the second end 525b, at least a part of which is extended to the outside of the hinge module 510, may press the second side surface of the elastic member 370 in accordance with the rotation of the hinge module 510. The second end 525b of the second pressing part 525 may be substantially flat. The second end 525b of the second pressing part 525 may include a curved surface.

According to an embodiment, as shown in FIG. 5A, in the case that the foldable electronic device 500 is in a folded state, the second end 525b may be disposed so as not to press the second side surface of the elastic member 370. For example, in the case that the foldable electronic device 500 is in the folded state, the second end 525b of the second pressing part 525 may be disposed away from the elastic member 370 not to press the second side surface of the elastic member 370.

According to an embodiment, the second pressing part 525, as shown in FIG. 5B, in the case that the foldable electronic device 500 is in an unfolded state, may be disposed so that the second end 525b may press the second side surface of the elastic member 370. For example, in the case that the foldable electronic device 500 is in an unfolded state, the second end 525b of the second pressing part 525 may be disposed to contact and press the second side surface of the elastic member 370.

According to one or more embodiments, in the case that the foldable electronic device 500 is in a folded state (e.g., FIG. 5A), the first pressing part 515 and the second pressing part 525 may not press the first side surface and the second side surface of the elastic member 370 in accordance with the rotation of the hinge module 510. In this case, the elastic member 370 may be pressed from an upper portion (e.g., y-axis) by the bending area 345 of the flexible display 340, be contracted in a lower direction (e.g., −y-axis), and be deformed to expand in left and right directions (e.g., −x-axis, x-axis).

According to one or more embodiments, in the case that the foldable electronic device 500 is in an unfolded state (e.g., FIG. 5B), the first pressing part 515 and the second pressing part 525 may be disposed to press the first side surface and the second side surface of the elastic member 370 in accordance with the rotation of the hinge module 510. In this case, the elastic member 370 may support the bending area 345 of the flexible display 340 by being contracted in left and right directions (e.g., −x-axis, x-axis) and be deformed to expand in an upper direction (e.g., y-axis).

According to one or more embodiments, the first support member 331 may support the first planar area 341 of the flexible display 340. The first support member 331 may be connected to at least a portion of the hinge module 510. The first support member 331 may rotate to correspond to the rotation of the hinge module 510.

According to one or more embodiments, the second support member 332 may support the second planar area 342 of the flexible display 340. The second support member 332 may be connected to at least a portion of the hinge module 510. The second support member 332 may rotate to correspond to the rotation of the hinge module 510.

According to one or more embodiments, the flexible display 340 may include a first planar area 341, a second planar area 342, and a bending are 345 (e.g., a folding area) connecting the first planar area 341 and the second planar area 342. The first planar area 341 may be disposed on top of the first support member 331. The second planar area 342 may be disposed on top of the second support member 332. The bending area 345 may be disposed on top of the elastic member 370.

According to an embodiment, in the case that the foldable electronic device 500 is in a folded state (e.g., FIG. 5A), the bending area 345 may be bent to press the upper portion of the elastic member 370, and it may deform the elastic member 370 to be contracted in a downward direction.

According to one or more embodiments, the hinge cover 350 (e.g., a hinge housing) may support and cover the hinge module 510. The hinge cover 350 may be exposed to the outside in the case that the foldable electronic device 500 is in a folded state (e.g., FIG. 5A). In the case that the foldable electronic device 500 is in an unfolded state (e.g., FIG. 5B), the hinge cover 350 may be drawn into the inner space of the first housing 361 and the inner space of the second housing 362, and it may not be exposed to the outside.

According to an embodiment, the hinge cover 350 may be disposed between the first housing 361 and the second housing 362. The hinge cover 350 may protect the hinge module 510.

According to one or more embodiments, the first housing 361 may be connected to a portion of the hinge module 510. As the first housing 361 rotates at a predetermined angle, the hinge module 510 may also partially rotate.

According to one or more embodiments, the second housing 362 may be connected to another part of the second hinge module 320. As the second housing 362 rotates at a predetermined angle, the hinge module 510 may also partially rotate.

According to an embodiment, as the first support members 331 and the second support member 332 rotate through the hinge module 510, the first housing 361 and the second housing 362 may be rotated to correspond thereto.

According to one or more embodiments, the elastic member 370 may be provided in a space (e.g., an air gap) formed between the bending area 345 (e.g., a folding area) of the flexible display 340 and the hinge cover 350. The elastic member 370 may be disposed between the bending area 345 of the flexible display 340 and the hinge cover 350. The upper surface of the elastic member 370 may contact the lower surface of the bending area 345. The lower surface of the elastic member 370 may contact the upper surface of the hinge cover 350.

According to an embodiment, in the case that the foldable electronic device 500 is in a folded state (e.g., FIG. 5A), as the second end 515b of the first pressing part 515 connected to a part of the hinge module 510 and the second end 525b of the second pressing part 525 connected to the other part of the hinge module 510 are each in a state of not pressing the elastic member 370, the first side surface and the second side surface of the elastic member 370 may not be pressed. In this case, the upper portion of the elastic member 370 may be pressed by the bending area 345 and it may be deformed to be contracted in a lower direction (e.g., the −y axis).

According to an embodiment, in the case that the foldable electronic device 500 is in an unfolded state (e.g., FIG. 5B), as the second end 515b of the first pressing part 515 connected to a part of the hinge module 510 and the second end 525b of the second pressing part 525 connected to another part of the hinge module 510 and the hinge of the first pressing part 515 connected to a part of the hinge module 510 are each in a state of pressing the elastic member 370, the first side surface and the second side surface of the elastic member 370 may be pressed. In this case, the elastic member 370 may support the bending area 345 by being contracted in left and right directions (e.g., −x-axis, x-axis) and being deformed to expand in an upper direction (e.g., y-axis).

Figure 6A:
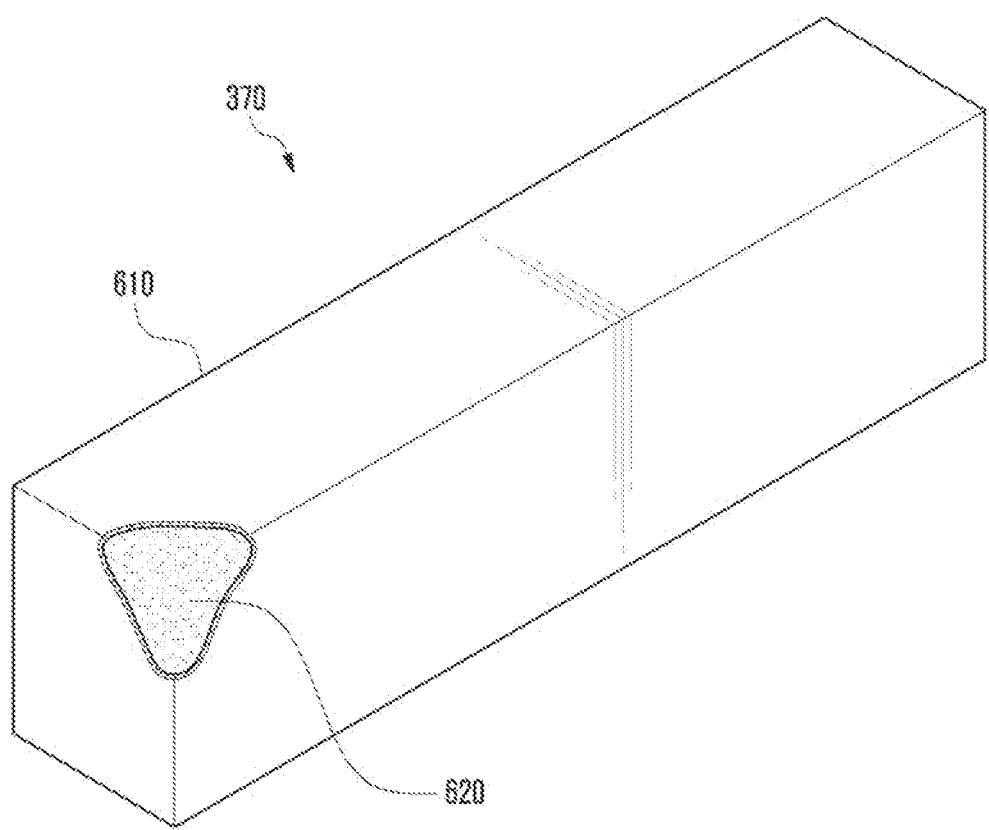
FIGS. 6A and 6B illustrate the configuration of an embodiment of an elastic member provided in a foldable electronic device according to one or more embodiments of the present disclosure.
Figure 6B:
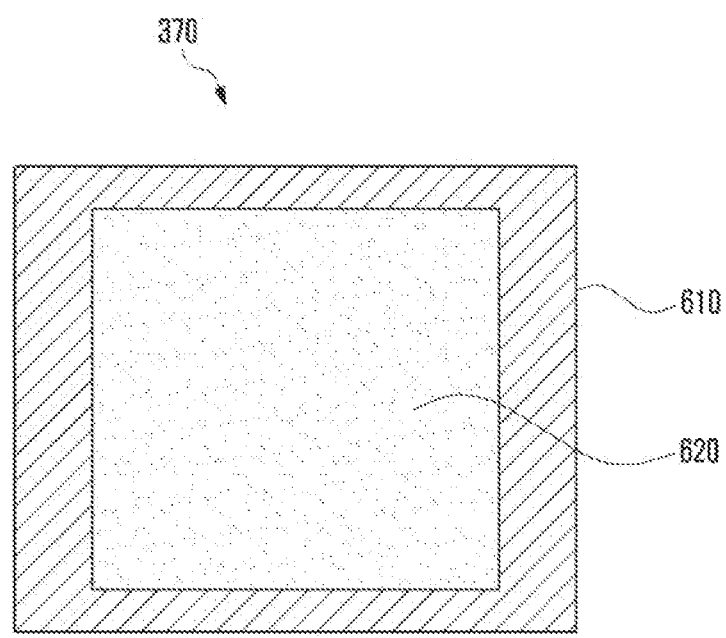

FIGS. 6A and 6B are diagrams illustrating the configuration of an embodiment of an elastic member provided in a foldable electronic device (e.g., 300, 400, 500) according to one or more embodiments of the present disclosure.

With reference to FIGS. 6A and 6B, the elastic member 370 according to an embodiment of the present disclosure may include an elastic body 610 and a filling material 620.

According to one or more embodiments, the elastic member 370 may have a rectangular tube shape. The elastic body 610 may form the outer layer of the elastic member 370. The elastic body 610 may be made of a rubber or silicone material having elasticity.

According to one or more embodiments, the filling material 620 may be filled inside the elastic body 610. The filling material 620 may be made of a material with high thermal conductivity. The filling material 620 may include at least one of a liquid, a gas, an elastic solid, or a powder.

According to an embodiment, the filling material 620 may include at least one of copper (Cu), aluminum (Al), silver (Au), graphite powder, or thermal grease. The filling material 620 is not limited to the above-described materials, and it may be made of various other materials having high thermal conductivity.

Figure 7:
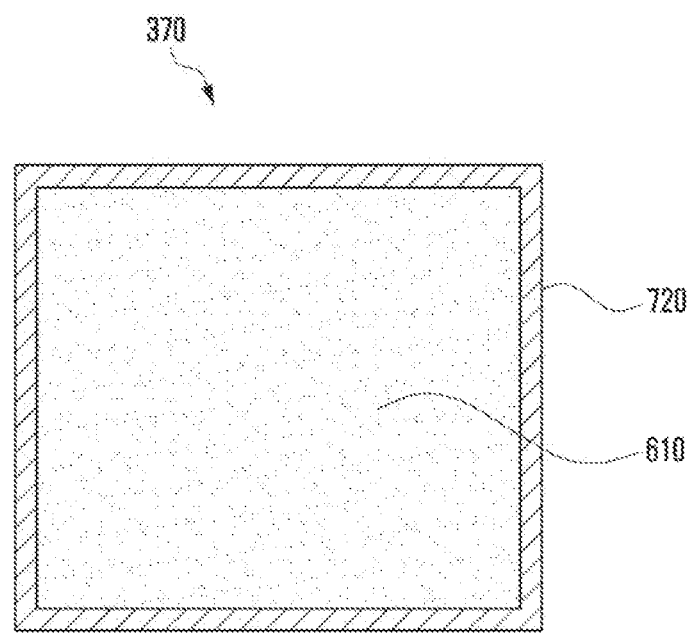
FIG. 7 illustrates a configuration of another embodiment of an elastic member provided in a foldable electronic device according to one or more embodiments of the present disclosure.

FIG. 7 is a cross-sectional view illustrating the configuration of another embodiment of the elastic member provided in the foldable electronic device (e.g., 300, 400, 500) according to one or more embodiments of the present disclosure.

With reference to FIG. 7, the elastic member 370 according to an embodiment of the present disclosure may include an elastic body 610 and a coating layer 720.

The elastic body 610 shown in FIG. 7 may include the elastic body 610 shown in FIGS. 6A and 6B.

According to one or more embodiments, the elastic member 370 may be configured by forming a coating layer 720 on the outside of the elastic body 610 having a rectangular tube shape.

According to one or more embodiments, the coating layer 720 may be made of a material having high thermal conductivity. The coating layer 720 may include a carbon and/or silver coating layer.

Figure 8:
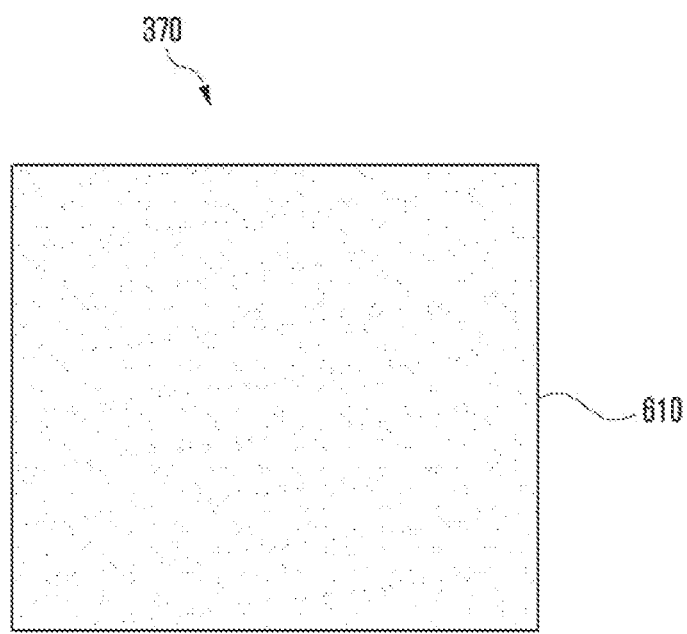
FIG. 8 illustrates a configuration of another embodiment of an elastic member provided in a foldable electronic device according to one or more embodiments of the present disclosure.

FIG. 8 is a cross-sectional view illustrating the configuration of another embodiment of an elastic member provided in a foldable electronic device (e.g., 300, 400, 500) according to one or more embodiments of the present disclosure.

With reference to FIG. 8, the elastic member 370 according to an embodiment of the present disclosure may be composed of an elastic body 610.

According to one or more embodiments, the elastic member 370 may be made of a single material having elasticity, such as rubber or silicone.

According to one or more embodiments, the elastic body 610 may include a carbon nanotube shape or a thermally conductive cushioning pad.

Figure 9:
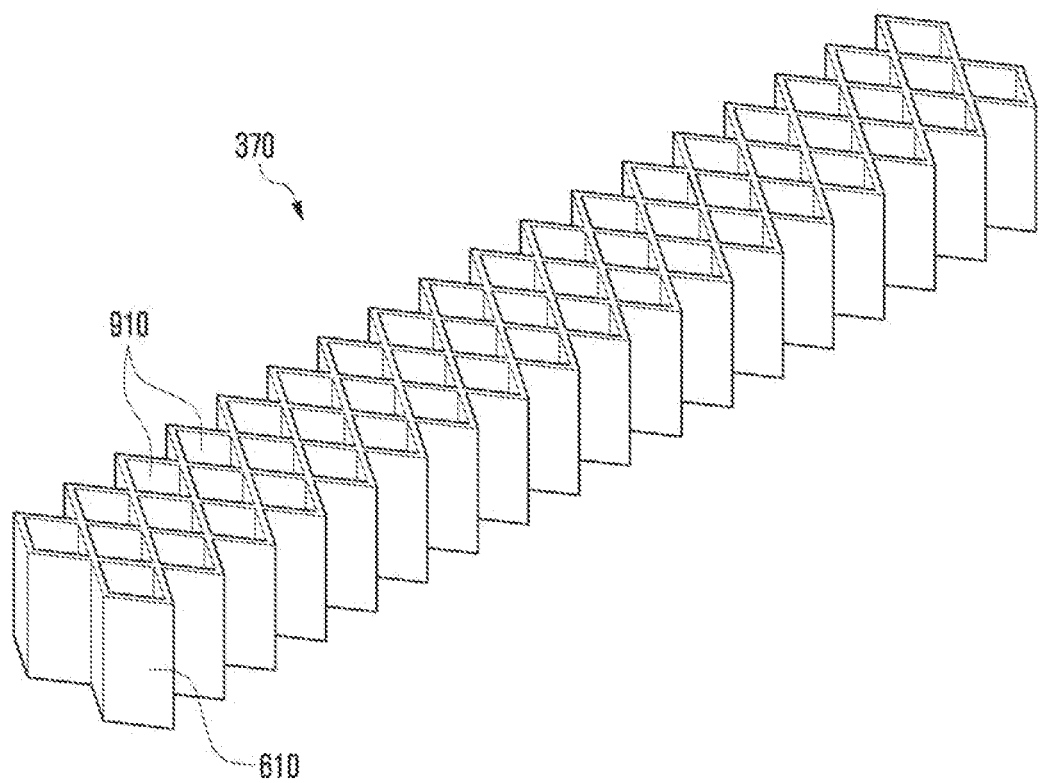
FIG. 9 illustrates the configuration of another embodiment of the elastic member provided in the foldable electronic device according to one or more embodiments of the present disclosure.

FIG. 9 is a diagram illustrating the configuration of another embodiment of the elastic member provided in the foldable electronic device (e.g., 300, 400, 500) according to one or more embodiments of the present disclosure.

With reference to FIG. 9, the elastic member 370 according to an embodiment of the present disclosure may include an elastic body 610 and a hole 910.

According to one or more embodiments, the elastic body 610 may be configured in a shape having at least one surface. The elastic body 610 may include at least one surface having an irregular outer surface. The elastic body 610 may include at least one hole 910. The elastic body 610 may include a lattice shape.

According to one or more embodiments, at least one hole 910 may be constituted to facilitate the deformation of the elastic member 370 and to reduce the load in accordance with the pressure in the case that the elastic member 370 is pressed by a first pressing part (e.g., the first pressing part 315 of FIG. 3B, the first pressing part 415 of FIG. 4B, or the first pressing part 515 of FIG. 5B) and a second pressing part (e.g., the second pressing part 325 of FIG. 3B, the second pressing part 425 of FIG. 4B, or the second pressing part 525 of FIG. 5B).

Figure 10:
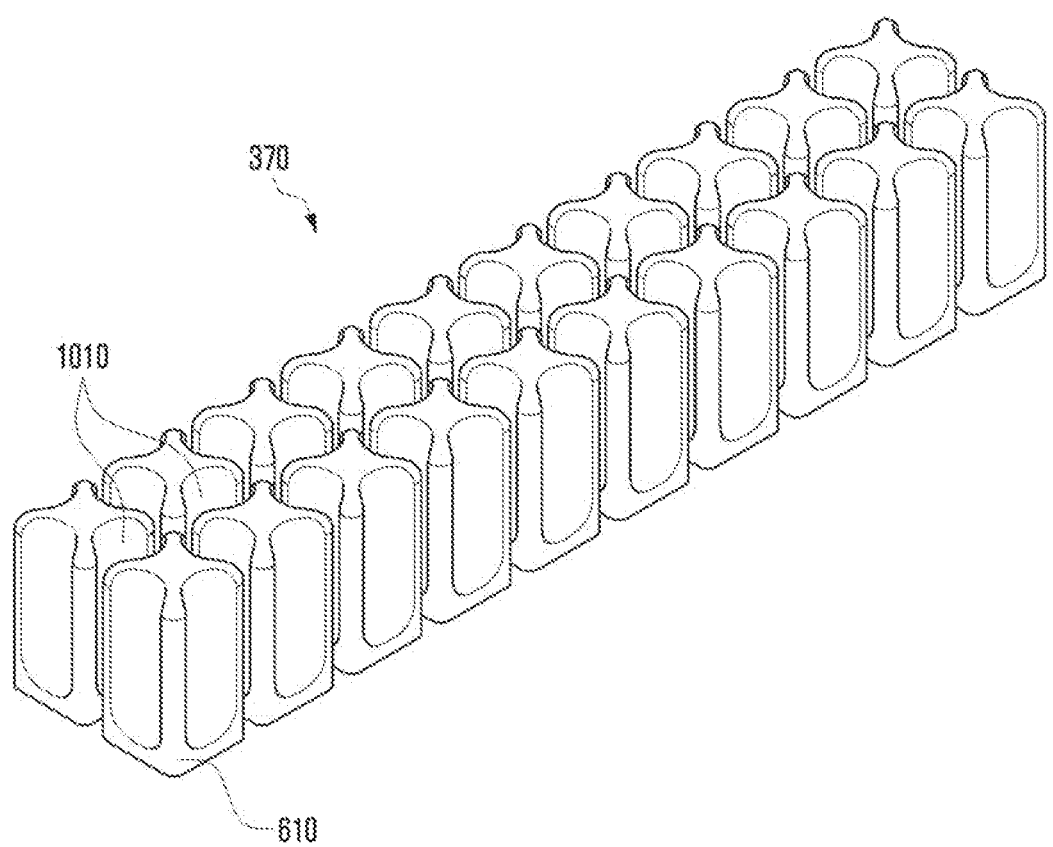
FIG. 10 illustrates the configuration of another embodiment of the elastic member provided in the foldable electronic device according to one or more embodiments of the present disclosure.

FIG. 10 is a diagram illustrating the configuration of another embodiment of the elastic member provided in the foldable electronic device (300, 400, 500) according to one or more embodiments of the present disclosure.

With reference to FIG. 10, the elastic member 370 according to an embodiment of the present disclosure may include an elastic body 610 and a slit 1010.

According to one or more embodiments, the elastic body 610 may be configured in a shape having at least one surface. The elastic body 610 may include at least one surface having an irregular outer surface. The elastic body 610 may include at least one slit 1010 therein.

According to one or more embodiments, at least one slit 1010 may be configured to facilitate the deformation of the elastic member 370 and to reduce the load in accordance with the pressure in the case that the elastic member 370 is pressed by a first pressing part (e.g., the first pressing part 315 of FIG. 3B, the first pressing part 415 of FIG. 4B, or the first pressing part 515 of FIG. 5B) and a second pressing part (e.g., the second pressing part 325 of FIG. 3B, the second pressing part 425 of FIG. 4B, or the second pressing part 525 of FIG. 5B).

Although the disclosure has been described above based on one or more embodiments of the disclosure, it is natural that a change and a modification within a range that does not depart from the technical spirit of the disclosure by a person having ordinary knowledge in the art to which the disclosure pertains also belongs to the disclosure.

What is claimed is:

1. A foldable electronic device comprising:
   a first hinge module;
   a first pressing part at least partially connected to the first hinge module;
   a first support member at least partially connected to the first hinge module;
   a first housing at least partially connected to the first hinge module;
   a second hinge module;
   a second pressing part at least partially connected to the second hinge module;
   a second support member at least partially connected to the second hinge module;
   a second housing at least partially connected to the second hinge module;
   a flexible display disposed on the first support member and the second support member;
   a hinge cover covering the first hinge module and the second hinge module; and
   an elastic member provided in a gap formed between at least a portion of the flexible display and the hinge cover,
   wherein, in a first case that the first housing and the second housing are in a substantially parallel unfolded state,
      the first pressing part and the second pressing part press a first side and a second side of the elastic member, and
      an upper portion of the elastic member supports at least a portion of the flexible display.

2. The foldable electronic device of claim 1, wherein, in a second case that the first housing and the second housing are in a folded state to substantially face each other,
   the first pressing part and the second pressing part do not press the first side and the second side of the elastic member, and
   at least a portion of the flexible display presses the upper portion of the elastic member.

3. The foldable electronic device of claim 2 further comprising:
   a first planar area disposed on an upper portion of the first support member;
   a second planar area disposed on an upper portion of the second support member; and
   a bending area connecting the first planar area and the second planar area, wherein the elastic member is provided between the bending area and the hinge cover.

4. The foldable electronic device of claim 3, wherein, in the second case that the first housing and the second housing are substantially in a folded state to face each other, at least a portion of the bending area presses the upper portion of the elastic member; and an upper surface of the elastic member is in contact with a lower surface of the bending area, and a lower surface of the elastic member is in contact with an upper surface of the hinge cover.

5. The foldable electronic device of claim 2, wherein:
the hinge cover is disposed between the first housing and the second housing and is exposed to an outside of the foldable electronic device in the second case that the first housing and the second housing are folded to substantially face each other, and
the hinge cover is not exposed to an outside of the foldable electronic device in the first case that the first housing and the second housing are in a substantially parallel unfolded state.

6. The foldable electronic device of claim 1, wherein:
the first hinge module comprises a first shaft and a first driving unit,
 a first end of the first pressing part is connected to the first shaft, and
 a second end presses a first side surface of the elastic member, and
the second hinge module comprises a second shaft and a second driving unit,
 a first end of the second pressing part is connected to the second shaft, and
 a second end presses a second side surface of the elastic member.

7. The foldable electronic device of claim 1, wherein the elastic member further comprises an elastic body having a rectangular tube shape having elasticity, the elastic body forming an outer layer of the elastic member, and a filling material filled in an inside of the elastic body,
 wherein the filling material is composed of a material with high thermal conductivity and is composed of at least one of copper (Cu), aluminum (Al), silver (Au), graphite powder, or thermal grease.

8. The foldable electronic device of claim 7, comprising a coating layer on an outside of the elastic body, wherein the coating layer includes a carbon and/or silver coating layer.

9. The foldable electronic device of claim 1, wherein the elastic member comprises an elastic body having at least one surface and the elastic body comprises at least one hole and/or at least one slit.

10. A foldable electronic device comprising:
a hinge module;
a first pressing part and a second pressing part each at least partially connected to the hinge module;
a first support member at least partially connected to the hinge module;
a second support member each at least partially connected to the hinge module;
a first housing at least partially connected to the hinge module;
a second housing at least partially connected to the hinge module;
a flexible display disposed on an upper portion of the first support member and an upper portion of the second support member;
a hinge cover that covers the hinge module; and
an elastic member provided in a gap formed between at least a portion of the flexible display and the hinge cover,
wherein, in a first case that the first housing and the second housing are in a substantially parallel unfolded state,
 the first pressing part and the second pressing part press at least a portion of a first side and a second side of the elastic member, and
 an upper portion of the elastic member supports at least a portion of the flexible display.

11. The foldable electronic device of claim 10, wherein, in a second case that the first housing and the second housing are substantially in a folded state to face each other,
 the first pressing part and the second pressing part are disposed not to press the first side and the second side of the elastic member, and
 at least a portion of the flexible display presses an upper portion of the elastic member.

12. The foldable electronic device of claim 11, wherein the flexible display comprises:
a first planar area disposed on the upper portion of the first support member;
a second planar area disposed on the upper portion of the second support member; and
a bending area connecting the first planar area and the second planar area, wherein the elastic member is provided between the bending area and the hinge cover.

13. The foldable electronic device of claim 12, wherein, in the second case that the first housing and the second housing are substantially in a folded state to face each other,
at least a portion of the bending area presses the upper portion of the elastic member; and
an upper surface of the elastic member is in contact with a lower surface of the bending area, and
a lower surface of the elastic member is in contact with an upper surface of the hinge cover.

14. The foldable electronic device of claim 11, wherein:
the hinge cover is disposed between the first housing and the second housing and is exposed to an outside of the foldable electronic device in the second case that the first housing and the second housing are folded to substantially face each other, and
the hinge cover is not exposed to the outside of the foldable electronic device in the first case that the first housing and the second housing are in a substantially parallel unfolded state.

15. The foldable electronic device of claim 10, wherein the elastic member further comprises:
an elastic body having a rectangular tube shape having elasticity, the elastic body forming an outer layer of the elastic member, and
a filling material filled in an inside of the elastic body, wherein the filling material is composed of a material with high thermal conductivity and is composed of at least one of copper (Cu), aluminum (Al), silver (Au), graphite powder, or thermal grease.

* * * * *